United States Patent [19]
Sato

[11] Patent Number: 5,993,129
[45] Date of Patent: Nov. 30, 1999

[54] BOLT ANCHORING DEVICE WITH IMPROVED PLUG PORTION OF BOLT

[75] Inventor: Yoshinori Sato, Tokyo, Japan

[73] Assignee: Kabushiki Kaisha Youma Kohboh, Japan

[21] Appl. No.: 08/939,484

[22] Filed: Sep. 29, 1997

[30] Foreign Application Priority Data

| Oct. 4, 1996 | [JP] | Japan | 8-263990 |
| Oct. 4, 1996 | [JP] | Japan | 8-263991 |
| Oct. 4, 1996 | [JP] | Japan | 8-263992 |
| Sep. 17, 1997 | [JP] | Japan | 9-251723 |

[51] Int. Cl.$^6$ .................................................. F16B 13/06
[52] U.S. Cl. .............................. 411/80.6; 411/71; 411/43; 411/60.1
[58] Field of Search .................................... 411/71–73, 55, 411/43, 45, 49, 80.6, 80.5, 57.1, 60.1, 60.2

[56] References Cited

U.S. PATENT DOCUMENTS

| 4,135,432 | 1/1979 | Schlage | 411/57 |
| 4,259,890 | 4/1981 | Walsh | 411/57 |

FOREIGN PATENT DOCUMENTS

| 56854 | 8/1982 | European Pat. Off. | 411/57 |
| 0307590 | 3/1989 | European Pat. Off. . | |
| 0732515 | 9/1996 | European Pat. Off. . | |
| 1418226 | 10/1965 | France | 411/45 |
| 821412 | 11/1951 | Germany . | |
| 4305893 | 9/1994 | Germany . | |
| 6507571 | 8/1955 | Netherlands | 411/45 |
| 2420 | of 1913 | United Kingdom . | |
| 438873 | 11/1935 | United Kingdom | 411/57 |
| 2183768 | 6/1987 | United Kingdom . | |

Primary Examiner—Flemming Saether
Attorney, Agent, or Firm—Bachman & LaPointe, P.C.

[57] ABSTRACT

A bolt anchoring device for insertion into a bore in a concrete ceiling or the like material is provided. The bolt anchoring device comprises an anchor sleeve and a bolt. The anchor sleeve is first inserted in the bore for its provisional or temporary attachment. The bolt is then screwed into the anchor sleeve for permanent attachment of the anchor sleeve and the bolt. In one embodiment, the bolt is removable after permanent attachment of the anchor sleeve. The anchor sleeve has a self-retaining means for retaining itself in the bore at the time of its provisional or temporary attachment. The anchor sleeve has a first end portion having a threaded hole and a second end portion having a plurality axial slits. The bolt has an integral plug portion which is pushed into the second end portion to expand the second end portion and make it cut into an inner wall surface of the bore for thereby firmly securing the anchor sleeve in the bore. The plug portion is generally cylindrical and uniform in diameter so that it is hardly removed from the second end portion of the sleeve when once pushed into the second end portion. In one embodiment, the plug portion is twisted off from the bolt when the bolt is twisted by a torque larger than a predetermined value so that the bolt can be removed after permanent attachment of the anchor sleeve.

8 Claims, 26 Drawing Sheets

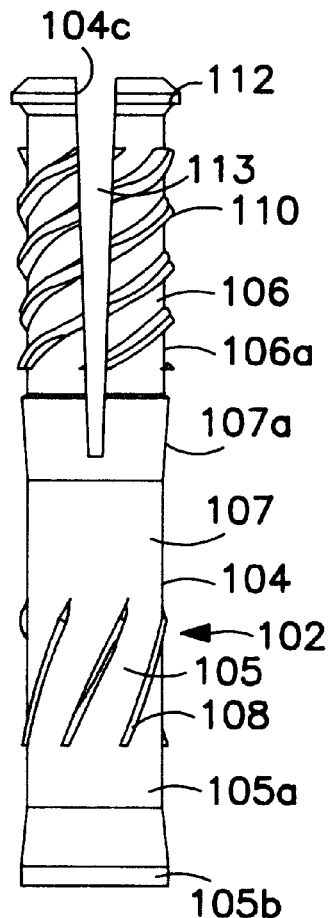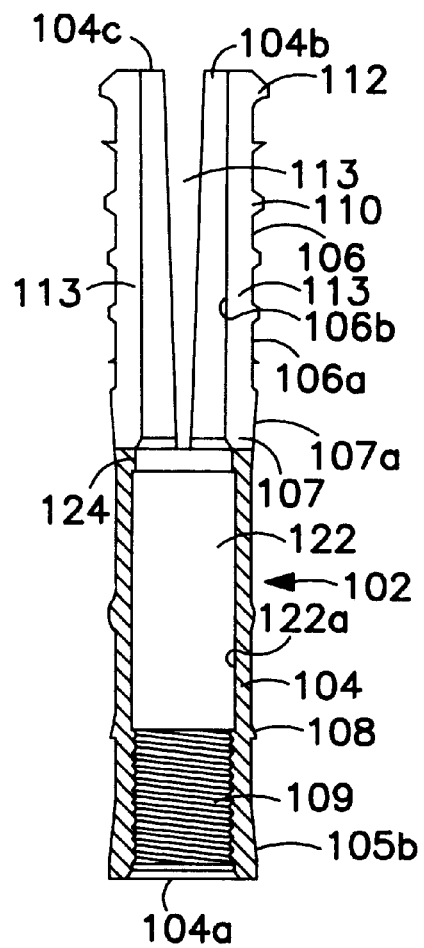
FIG. 12A
FIG. 12B

BOLT ANCHORING DEVICE WITH IMPROVED PLUG PORTION OF BOLT

BACKGROUND OF THE INVENTION

1. Field of the Invention

The present invention relates to bolt anchoring devices. More particularly, the present invention relates to a bolt anchoring device including an anchor sleeve received in a pre-drilled bore in a wall of a building or the like and a bolt screwed into the anchor sleeve to expand an inner end of the anchor sleeve and make it engage the inner wall surface of the bore for thereby securing the bolt in the bore.

2. Description of the Related Art

A number of bolt anchoring devices of the kind which are attached to a wall or the like structure after the structure is completed have heretofore been proposed. An example of such a bolt anchoring device is disclosed in Japanese utility model provisional publication No. 62-18413 and includes an anchor sleeve or socket having a split end portion in which a plug having a truncated cone shape is disposed. The anchor sleeve is driven into a bore in a wall together with the plug by means of a special tool. As the plug goes near the bottom of the hole, it spreads or expands the split end portion of the anchor sleeve radially outward for thereby making the anchor sleeve be secured in the bore. A bolt is then screwed into the anchor sleeve to be held or supported thereby. Similar bolt anchoring devices are disclosed in Japanese patent provisional publication Nos. 6-330525 and 6-116953.

Another example of a bolt anchoring device is disclosed in Japanese patent provisional publication No. 59-147110 and includes an anchor sleeve having a split end portion, i.e., an end portion formed with expanding slots or slits. The split end portion has a conical or tapered inner wall surface. An insert or plug is pushed into the anchor sleeve and driven toward the bottom of a bore in which the anchor sleeve is received. By this, the split end portion is spread or expanded so that the anchor sleeve is held fast or secured in the bore. A similar bolt anchoring device is disclosed in Japanese utility model provisional publication No. 5-94333.

The above described prior art bolt anchoring devices require that the anchor sleeve and the plug be driven into the bore by beating or striking to expand the end portion of the anchor sleeve. Thus, in the case of installation or attachment of a metallic part for hanging a picture from a wall or a metallic part for preventing a furniture from falling, there is the possibility that damage or breakage of the wall and its facing or peeling of a wallpaper is liable to be caused, and great shocks, vibrations and noises are caused to give annoyance to the neighbors.

The anchor sleeve adapted to be expanded by striking requires that the bore in a ceiling or the like structure be accurate in depth. If the bore is too deep, a desired pull-out strength cannot be obtained. Further, it is difficult to ascertain the strength with which the anchor sleeve is attached to the structure. If the hole is not accurate in depth, there is caused an irregularity in the length by which the anchor sleeve protrudes outward from the ceiling or the like structure, and therefore the appearance is deteriorated.

When the anchor sleeve is to be driven into the wall or the like structure, a special tool made up of a driving rod having a head portion for pushing the anchor sleeve into the bore, is necessitated, which is inconvenient since expansion of the anchor sleeve cannot be attained without such a special tool.

The prior art anchoring device of the above described type requires three or more parts and it is hard to reduce the number of its constituent parts and therefore its manufacturing cost.

Further, the prior art anchoring device of the above described type have no means for assuredly checking or ascertaining whether the end of the sleeve is expanded completely or desirably and therefore have the possibility that the sleeve is not held fast or secured to the wall or the like structure and easily pulled off from same when the bolt screwed into such an anchor sleeve is subjected to a load.

SUMMARY OF THE INVENTION

According to an aspect of the present invention, there is provided a novel and improved bolt anchoring device for insertion into a material having a predrilled bore. The bolt anchoring device comprises a hollow, cylindrical anchor sleeve having a first end portion and a second end portion. The first end portion has a threaded hole, and the second end portion has a plurality of axial slits. The bolt anchoring device further comprises a bolt extending through the anchor sleeve. The bolt has a fastening rod portion threadably engaging the threaded hole and a plug portion pushed into the second end portion to expand the second end portion. The anchor sleeve has self-retaining means for retaining itself in the bore prior to driving of the plug portion of the bolt into the second end portion for making the second end portion be expanded and cut into an inner wall surface of the bore.

According to another aspect of the present invention, the self-retaining means comprises an annular rib formed on the second end portion. The rib is a little larger in diameter than the bore and cooperates with the slits so as to resiliently contract in diameter and pressed firmly against the inner wall surface of the bore when received in the bore.

According to a further aspect of the present invention, the self-retaining means further comprises a helical rib formed on the second end portion. The helical rib is caused to cut into the inner wall surface of the bore to secure the second end portion in the bore when the anchor sleeve is received in the bore.

According to a further aspect of the present invention, the self-retaining means further comprises a plurality of twisted ribs formed on the first end portion. The twisted ribs are caused to cut into the inner wall surface of the bore to secure the first end portion in the bore when the anchor sleeve is received in the bore.

According to a further embodiment of the present invention, the self-retaining means further comprises an axial end of the second end portion having a cylindrical outer surface section and a tapered outer surface section. The cylindrical outer surface section is a little larger in diameter than the bore, and the tapered outer surface section is positioned more axially inward than the cylindrical outer surface. The cylindrical outer surface is in pressed contact with an open end section of the inner wall surface of the bore to sealingly close the bore when the anchor sleeve is received in the bore.

According to a further aspect of the present invention, the self-retaining means further comprises a plurality of annular ribs formed on the second end portion. The second end portion has an axial end on the side opposite to the first end portion. The annular ribs are arranged so as to become larger in diameter as they are positioned nearer to the axial end of the second end portion.

According to a further aspect of the present invention, the self-retaining means further comprises a plurality of twisted ribs formed on the first end portion. The twisted ribs are caused to cut into the inner wall surface of the bore to secure the first end portion in the bore when the anchor sleeve is received in the bore.

According to a further aspect of the present invention, the self-retaining means further comprises an axial end of the second end portion having a cylindrical outer surface section and a tapered outer surface section. The cylindrical outer surface section is a little larger in diameter than the bore, and the tapered outer surface section is positioned more axially inward than the cylindrical outer surface section. The cylindrical outer surface section are in pressed contact with an open end section of the inner wall surface of the bore to sealingly close the bore when the anchor sleeve is received in the bore.

According to a further aspect of the present invention, the plug portion of the bolt is generally cylindrical and uniform in diameter.

According to a further aspect of the present invention, there is provided a bolt anchoring device for insertion into a material having a predrilled bore. The bolt anchoring device comprises a hollow, cylindrical anchor sleeve having a first end portion and a second end portion. The first end portion has a threaded hole, and the second end portion has a plurality of axial slits. The bolt anchoring device further comprises a bolt extending through the anchor sleeve. The bolt has a fastening rod portion threadably engaging the threaded hole and a plug portion pushed into the second end portion to expand the second end portion. The bolt has a cut at a joint between the plug portion and the fastening rod portion so as to cause the plug portion to be separated from the fastening rod portion when the difference between a tightening toque by which the bolt is turned for insertion into the anchor sleeve and a friction torque to which the plug portion is subjected due to a friction between the plug portion and an inner wall surface of the second end portion when the bolt is turned by the tightening torque, exceeds a predetermined value.

According to a further aspect of the present invention, the plug portion of the bolt is adapted to be separated from the fastening rod portion when the plug portion is pushed partially into the second end portion of the anchor sleeve so that the plug portion, after separated from the fastening rod portion, moves axially without causing any substantial rotation by being pushed by the fastening rod portion.

According to a further aspect of the present invention, the plug portion of the bolt has an end protruding from an open end of the second end portion of the anchor sleeve when disposed in place relative to the anchor sleeve. The plug portion has at the end thereof an engagement tooth engaged with the open end of the second end portion for preventing the plug portion from being removed from the second end portion of the anchor sleeve.

According to a further aspect of the present invention, the second end portion of the anchor sleeve has at an axial end thereof a rib in the form of an outward flange. The rib has an outer diameter larger than a diameter of the predrilled bore.

According to a further aspect of the present invention, the second end portion of the anchor sleeve has an axial end on the side opposite to the first end portion, and the inner wall surface of the second end portion is tapered toward the axial end of the second end portion.

According to a further aspect of the present invention, the anchor sleeve has a central portion between the first end portion and the second end portion. The axial slits are provided so as to extend to nearly an axial center of the central portion.

According to a further aspect of the present invention, the first end portion of the anchor sleeve has the threaded hole at an end thereof and a guide hole of a diameter a little larger than a major diameter of an internal thread of the threaded hole. The plug portion of the bolt has at a location next to the joint where the cut is provided, a flange slidable in the guide hole and deformable radially when subjected to a compressive load which is directed radially thereof and larger than a predetermined value.

According to a further aspect of the present invention, the flange of the bolt has an externally threaded outer surface engageable with the threaded hole of the first end portion of the anchor sleeve, and has such an axial length that enables the flange to deform radially when subjected to the compressive load.

According to a further aspect of the present invention, there is provided a bolt anchoring device which comprises a hollow, cylindrical anchor sleeve having a first end portion and a second end portion. The first end portion has a threaded hole, and the second end portion has a plurality of axial slits. The bolt anchoring device further comprises a bolt extending through the anchor sleeve. The bolt has a head having an internally threaded hole, a fastening rod portion threadably engaging the threaded hole and a plug portion pushed into the second end portion to expand the second end portion. The bolt has at an end of the head an integral nut having an internally threaded hole, and a cut at a joint between the head and the nut so as to cause the nut to be separated from the head when the nut is subjected to a predetermined torque.

According to a further aspect of the present invention, the plug portion of the bolt has an end protruding from an open axial end of the second end portion of the anchor sleeve when disposed in place relative to the anchor sleeve. The plug portion has at the end thereof an engaging means for engaging the open axial end of the second end portion and preventing the plug portion from being removed from the second end portion of the anchor sleeve when the bolt is subjected to the torque for separating the nut from the head.

According to a further aspect of the present invention, the engaging means comprises an annular engagement tooth.

According to a further aspect of the present invention, there is provided a bolt anchoring device which comprises a hollow, cylindrical anchor sleeve having a first end portion and a second end portion having an axial end on the side opposite to the first end portion. The first end portion has a threaded hole, and the second end portion has a plurality of axial slits. The bolt anchoring device further comprises a bolt extending through the anchor sleeve. The bolt has a fastening rod portion threadably engaging the threaded hole and a plug portion pushed into the second end portion to expand the second end portion. The anchor sleeve is uniform in outer diameter at the second end portion and has a plurality of annular ribs formed on the second end portion. The annular ribs are arranged so as to become larger in diameter as they are positioned nearer to the axial end of the second end portion.

According to a further aspect of the present invention, the bolt has a cut at a joint between the plug portion and the fastening rod portion so as to cause the plug portion to be separated from the fastening rod portion when the difference between a tightening toque by which the bolt is turned for insertion into the anchor sleeve and a friction torque to which the plug portion is subjected due to a friction between the plug portion and an inner wall surface of the second end portion when the bolt is turned by the tightening torque, exceeds a predetermined value.

According to a further aspect of the present invention, the plug portion of the bolt is adapted to be separated from the fastening rod portion when the plug portion is pushed partially into the second end portion of the anchor sleeve so that the plug portion, after separated from the fastening rod portion, moves axially without causing any substantial rotation by being pushed by the fastening rod portion.

According to a further aspect of the present invention, the plug portion of the bolt has an end protruding from an open end of the second end portion of the anchor sleeve when disposed in place relative to the anchor sleeve. The plug portion has at the end thereof an engagement tooth engaged with the open end of the second end portion for preventing the plug portion from being removed from the second end portion of the anchor sleeve.

According to a further aspect of the present invention, the anchor sleeve has a central portion between the first end portion and the second end portion. The axial slits are provided so as to extend to nearly an axial center of the central portion.

According to a further aspect of the present invention, each of the slits has a larger width section and a smaller width section. The smaller width section is located axially more inward than the larger width section.

The above structure is effective for solving the above noted problems inherent in the prior art device.

It is accordingly an object of the present invention to provide a novel and improved bolt anchoring device whose attachment or installation can be attained by a turning force or torque applied thereto without requiring such a large striking force that causes a large striking noise and large shocks and vibrations that are annoyance to the neighbors.

It is a further object of the present invention to provide a novel and improved bolt anchoring device of the foregoing character whose attachment or installation can be attained by a quiet work and without requiring a particular tool.

It is a further object of the present invention to provide a novel and improved bolt anchoring device of the foregoing character whose attachment or installation can be attained with least possibility of damaging a wall of a building or the like material in which it is installed.

It is a further object of the present invention to provide a novel and improved bolt anchoring device of the foregoing character whose anchor sleeve can be installed in place accurately without requiring a bore in which the anchor sleeve is installed, to be accurate in depth, thus enabling a bolt disposed in place relative to the anchor sleeve to have a uniform protruded length irrespective of the depth of the bore.

It is a further object of the present invention to provide a novel and improved bolt anchoring device of the foregoing character whose anchor sleeve can retain itself assuredly in a bore for its provisional or temporary attachment, whereby permanent attachment of its anchor sleeve and bolt can be attained easily and assuredly.

It is a further object of the present invention to provide a novel and improved bolt anchoring device of the foregoing character whose bolt can be removed from the anchor sleeve at any time without causing any deterioration of the attachment of the anchor sleeve.

It is a further object of the present invention to provide a novel and improved bolt anchoring device which is comprised of only two parts and thus can be manufactured with ease and efficiency and therefore at low cost.

BRIEF DESCRIPTION OF THE DRAWINGS

FIGS. 12A is a side elevational view of an anchor sleeve for use in a bolt anchoring device according to the second embodiment of the present invention;

FIG. 12B a longitudinal sectional view of the anchor sleeve of FIG. 12A;

DETAILED DESCRIPTION OF THE PREFERRED EMBODIMENTS

Referring first to FIGS. 1 to 3B, a bolt anchoring device according to an embodiment of the present invention includes an anchor socket or sleeve 2 which is to be fixed or secured within a bore 1 in a concrete ceiling C or the like building material or supporting structure, and a bolt 3 screwed into the anchor sleeve 2. The bore 1 is predrilled in the concrete ceiling C by means of a drill (not shown) and by a work which is done under the ceiling C.

Figure 1:
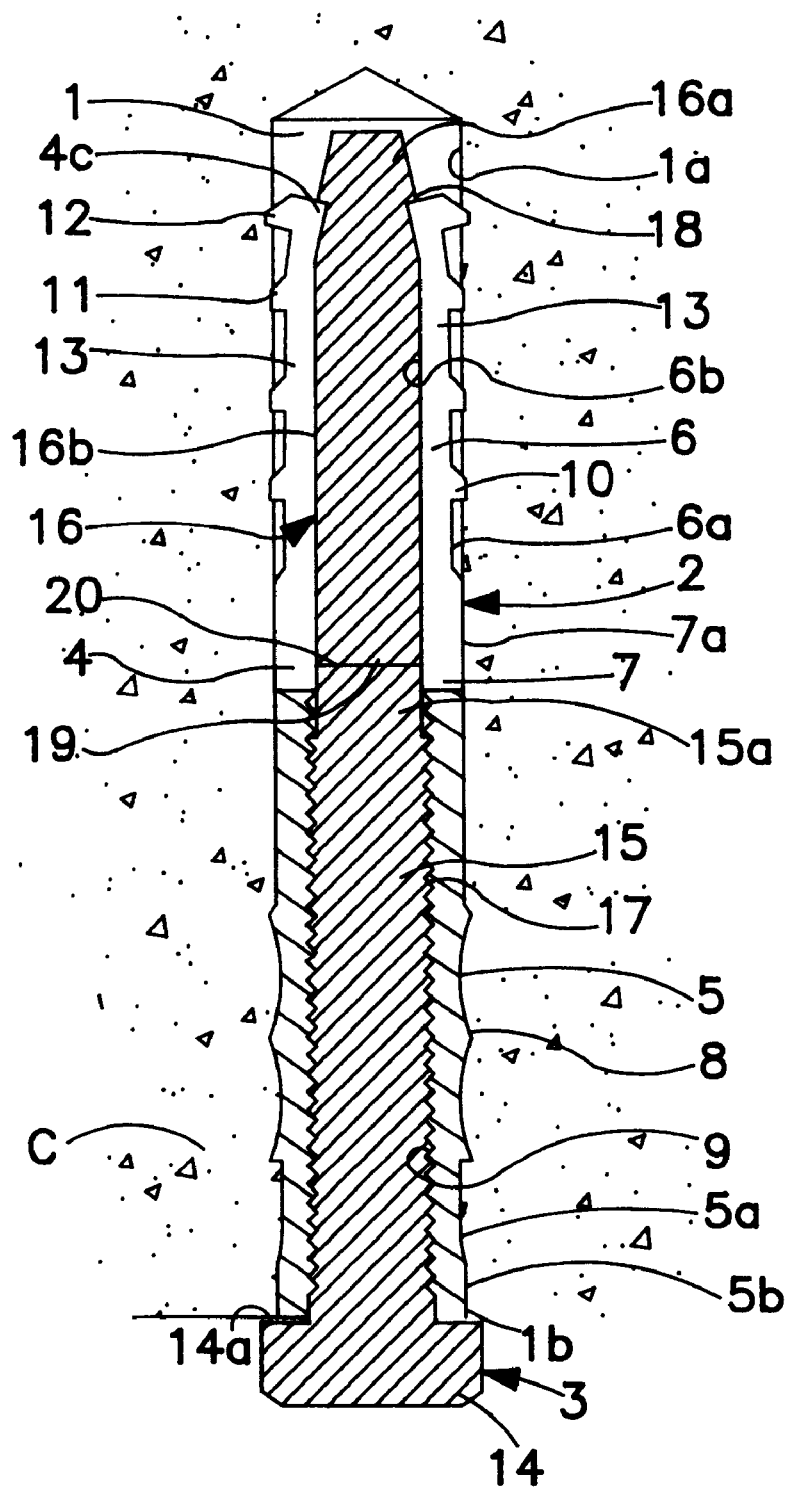
FIG. 1 is a longitudinal sectional view of a bolt anchoring device according to the first embodiment of the present invention received within a bore.
Figure 2A:
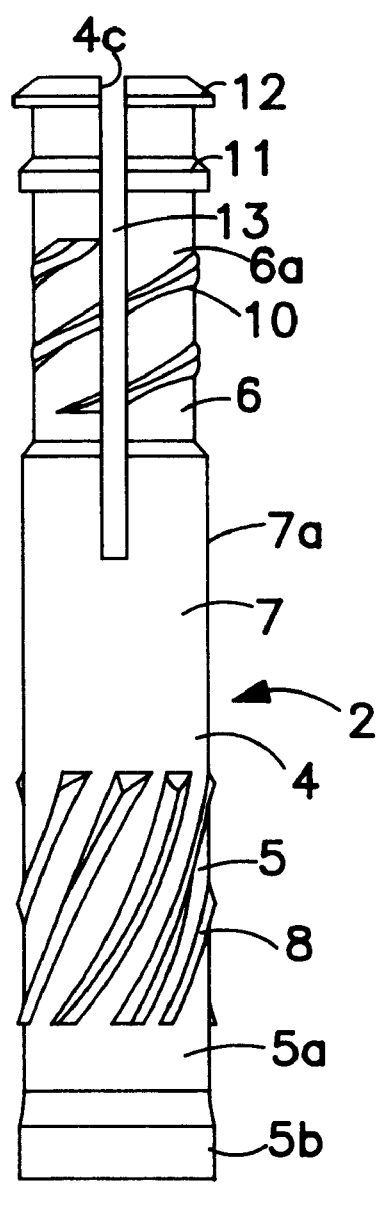
FIG. 2A is a side elevational view of an anchor sleeve employed in the bolt anchoring device of FIG. 1.
Figure 2B:
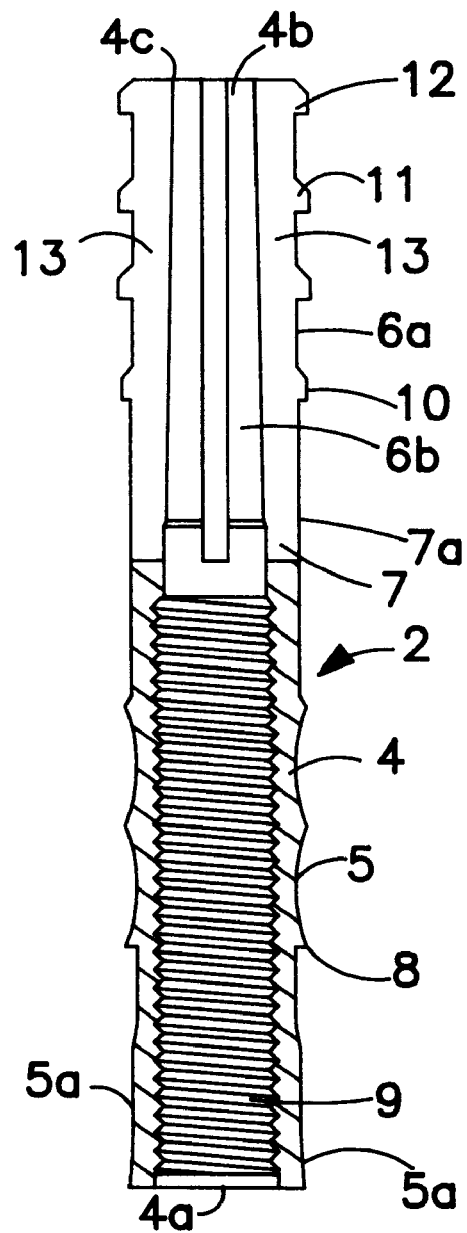
FIG. 2B is a longitudinal sectional view of the anchor sleeve of FIG. 2A.

As shown in FIGS. 2A and 2B, the anchor sleeve 2 has a tubular body 4 of a predetermined length. The tubular body 4 has openings 4a and 4b at opposite ends thereof and consists of three axially elongated portions, i.e., a first end portion 5, a second end portion 6 and a central portion 7 between the first and second end portions 5 and 6. The anchor sleeve 2 further has on an outer circumferential surface 5a of the first end portion 5 of the tubular body 4, a plurality of integral twisted ribs 8, i.e., ribs 8 twisted oblique to the axis of the anchor sleeve 2. The twisted ribs 8 extend longitudinally and circumferentially of the tubular body 4. The tubular body 4 has an internally threaded inner circumferential surface section 9 axially extended generally throughout the first end portion 5 having the opening 4a and partially to the central portion 7. The outer circumferential surface 5a of the first end portion 5 has at a location adjacent the opening 4a a tapered outer circumferential surface section which is tapered axially inward or toward the second end portion 6 and a lower end cylindrical surface section 5b which is maximum in diameter.

The second end portion 6 of the tubular body 4 has an outer circumferential surface 6a which tapers gradually toward an opening 4b side end. The outer circumferential surface 6a is provided next to a cylindrical outer circumferential surface 7a of the central portion 7 and extends therefrom to the opening 4b side end. The second end portion 6 also has an inner circumferential surface 6b which tapers gradually toward an open terminal end 4C where the opening 4b is provided. The inner circumferential surface 6b is provided next to a cylindrical inner circumferential surface of the central portion 7 and extends therefrom to the open terminal end 4C. The second end portion 6 has an integral helical rib 10 on the outer circumferential surface 6a. The helical rib 10 is located so as to extend over an area at and adjacent the axially central part of the second end portion 6 and is twisted in the same direction with the twisted ribs 8. The second end portion 6 is further provided with two integral, annular or ring-shaped ribs 12 and 11 at and adjacent the open terminal end 4C, respectively.

Further, the second end portion 6 has four axial slits 13 which are arranged at circumferential intervals of 90 degrees. By this, the second end portion 6 is formed into a split end portion expansible radially outward and inward. Each slit 13 is elongated so as to extend axially from the open terminal end 4C to the central portion 7.

The above described twisted ribs 8 at the first end portion 5 have a nearly triangular cross section, whereas the helical rib 10 and the annular ribs 11 and 12 have trapezoidal cross sections including an inclined upper side (upper in FIG. 2B) and a nearly horizontal lower side (lower in FIG. 2B). Further, the annular rib 12 at the terminal end of the tubular body 4 has an outer diameter which is larger than the inner diameter of the bore 1 in the concrete ceiling C, the outer diameter of the lower annular rib 11 and the outer diameter of the helical rib 10.

Figure 3A:
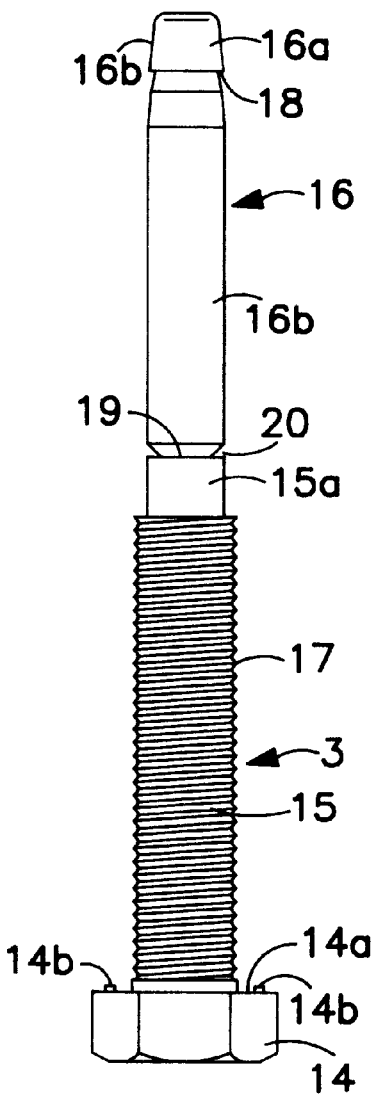
FIG. 3A is a side elevational view of a bolt employed in the bolt anchoring device of FIG. 1.
Figure 3B:
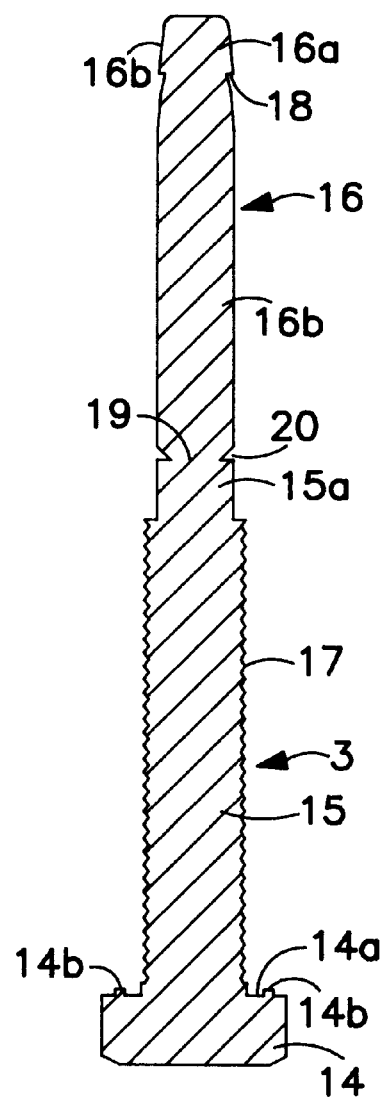
FIG. 3B is a longitudinal sectional view of the bolt of FIG. 3A.

As shown in FIGS. 3A and 3B, the above described bolt 3 has a hexagonal head 14, a fastening rod portion 15 integral with the head 14, and an expansion rod or plug portion 16 next to and integral with the fastening rod portion 15 and constituting an end portion of the bolt 3.

The above described head 14 has at an axially inner end surface 14a thereof a plurality of projections 14b which are so small in diameter as to crush or deform when pressed against a lower surface of an angle 21 through which the bolt 3 passes when it is screwed into the anchor sleeve 2 to support together the angle 21 which will be described more in detail hereinlater.

The fastening rod portion 15 has such a predetermined length as to be received completely within the anchor sleeve 2 and has an externally threaded section 17 which is provided all over the outer circumferential surface thereof except for an end section 15a.

The plug portion 16 is nearly equal in diameter to the end section 15a of the fastening rod portion 15 and has such an axial length that allows, in cooperation with the length of the fastening rod portion 15, its terminal end section 16a to protrude outward from the anchor sleeve 2 through the opening 4b. The plug portion 16 has a flat outer circumferential surface 16a which is not formed with threads or the like. Further, the terminal end section 16a of the plug portion 16 tapers gradually outward, i.e., has an outer circumferential surface 16b that reduces gradually in diameter toward the outward axial termination thereof. The terminal end section 16a further has an integral, annular tooth 18 that engages the open terminal end 4C of the anchor sleeve 2 when the bolt 3 is placed in a predetermined position within the anchor sleeve 2, whereby to serve as a locking engagement means for preventing the terminal end section 16a from moving back into the anchor sleeve 2.

At a joint 19 where the fastening rod portion 15 and the plug portion 16 meet, the bolt 3 is formed with an annular groove 20 for separation of the fastening rod portion 15 and the plug portion 16. The annular groove 20 has such a depth that causes the fastening bolt portion 15 and the plug portion 16 to be separated or twisted off from each other at the joint 19 when the bolt 3 is inserted into the anchor sleeve 2 and tightened with a torque larger than a predetermined value, i.e., when the joint 19 is subjected to a torque larger than a predetermined value due to the frictional resistance between the inner wall surface 6b of the second end portion 6 and the outer wall surface 16b of the plug portion 16 or when the difference between a tightening toque by which the bolt 3 is turned for insertion into the anchor sleeve 2 and a friction torque to which the plug portion 16 is subjected due to a friction between the plug portion 16 and the inner wall surface of the second end portion 6 when the bolt 3 is turned by the tightening torque, exceeds a predetermined value.

Figure 4:
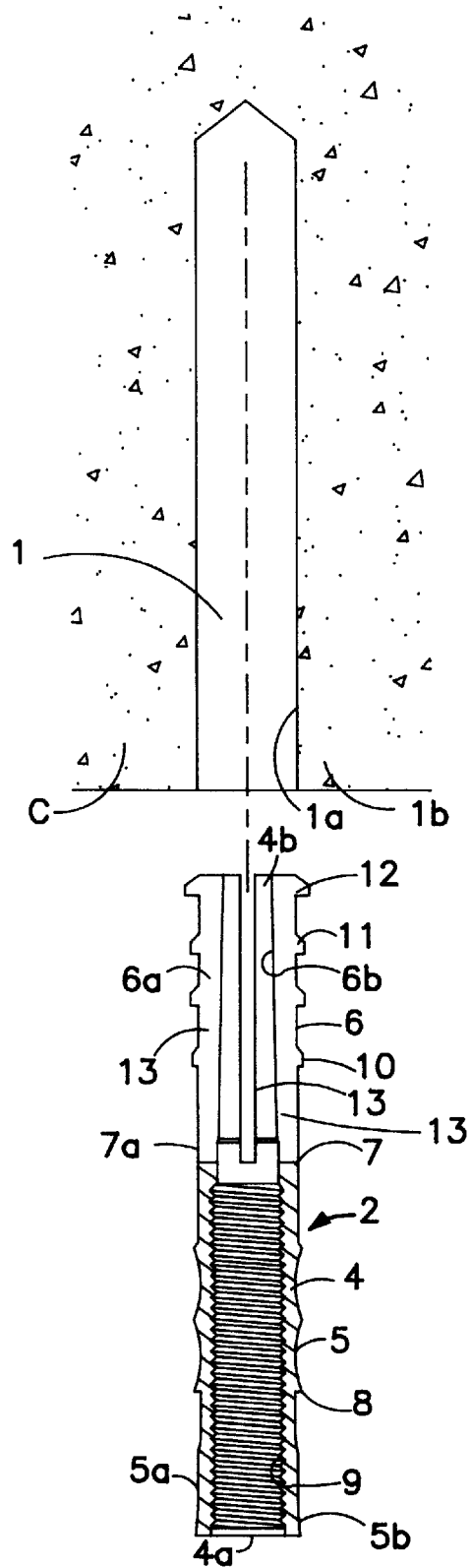
FIG. 4 is a reduced, longitudinal sectional view of the anchor sleeve of FIGS. 2A and 2B, together with a bore within which it is to be received.
Figure 5:
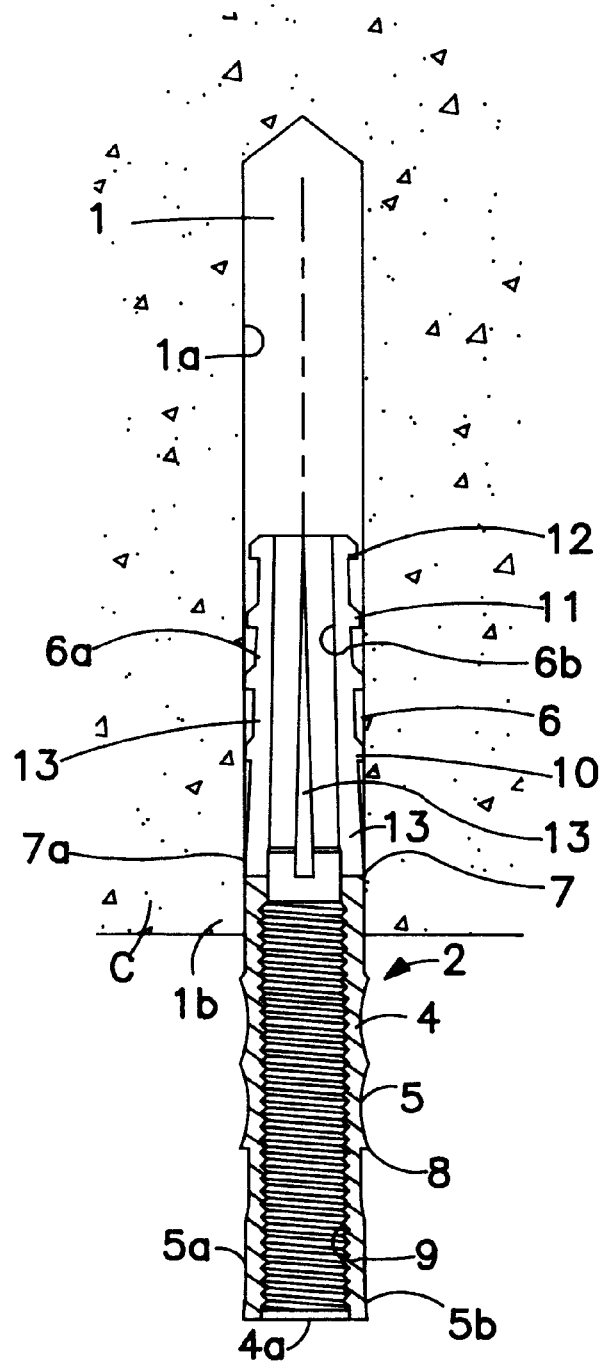
FIG. 5 is a reduce, longitudinal sectional view of the anchor sleeve of FIGS. 2A and 2B partially received within the bore.

The operation of the bolt anchoring device according to this embodiment will be described with reference to FIGS. 4 to 10. As shown in FIGS. 4 and 5, the second end portion 6 of the anchor sleeve 2 is first driven into the bore 1 in the concrete ceiling C by beating the first end portion 5 softly or lightly and upward by means of a hammer or the like tool. By so doing, the anchor sleeve 2 is positioned as desired relative to the bore 1. Thereafter, the first end portion 5 is beaten by a hammer or the like so as to be driven further into the bore 1 in the concrete ceiling C, whereby the anchor sleeve 2 is forcedly moved into the bore 1 while rotating by the effect of a guiding action provided by the twisted ribs 8 and the helical rib 10, while at the same time the larger diameter annular rib 12 at the second end portion 6 is subjected to a radially inward force which is applied thereto from the inner wall surface 1a of the bore 1 to cause the second end portion 6 to deform as shown in FIG. 5, i.e., to reduce in diameter by the effect of the slits 13. Particularly, since the annular rib 12 causes the second end portion 16 to reduce more in diameter at the terminal end thereof, so a large radial reaction force is caused at the terminal end of the second end portion 6 to enable the anchor sleeve 2 to be held fast or secured firmly in its entirety to the inner wall surface 1a of the bore 1 in the concrete ceiling C. Further, since the twisted ribs 8 and the helical rib 10 cut into the inner wall surface 1a of the bore 1 in the concrete ceiling C to increase the frictional resistance therebetween, provisional or temporary attachment of the anchor sleeve 2 can be more firm and assured. Accordingly, it becomes unnecessary for the worker looking upward to keep holding the anchor sleeve 2 by hand, thus making easier the work to be done thereafter.

Figure 6:
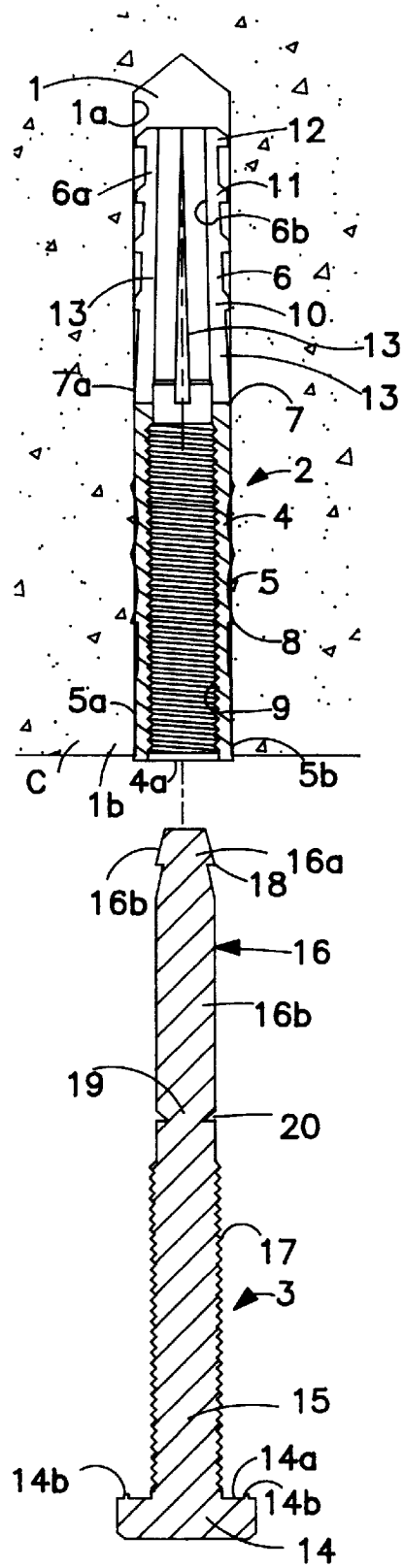
FIG. 6 is an exploded and reduced, longitudinal sectional view of the bolt anchoring device of FIG. 1 in a state of the anchor sleeve being received within the bore.

Further, when the anchor sleeve 2 is received within the bore 1 as shown in FIG. 6, it is firmly held in a provisionally or temporarily attached condition by means of a radially outward reaction force with which the annular rib 12 is urged against the inner wall surface 1a defining the bore 1, while at the same time the cylindrical, lower end surface section 5b is forcedly fitted in an open end 1b of the bore 1 to serve as a stopper for preventing excess driving of the anchor sleeve 2 into the bore 1. Further, such a lower end surface section 5b can close the open end 1b of the bore 1 in the concrete ceiling C to provide a watertight seal therebetween, thus making it possible to prevent dropping of water from the bore 1 and improve the appearance.

The twisted ribs 8 have a nearly triangular cross section, so they can cut into the inner wall surface 1a of the bore 1 with ease. The helical rib 10 and the annular ribs 11 and 12 have the above described trapezoidal cross section, so they can attain a large engagement force with which they are engaged in the inner wall surface 1a of the bore 1, thus further increasing the force for the provisional attachment.

The bolt 3 is screwed into the anchor sleeve 2 having been previously and provisionally secured firmly in the bore 1.

Figure 7:
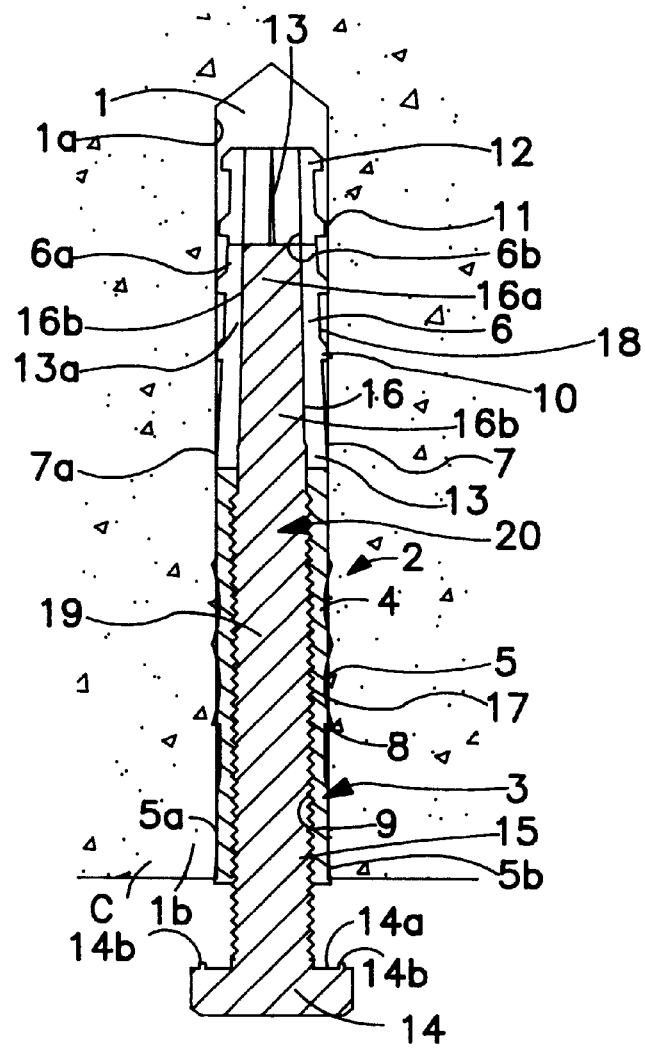
FIG. 7 is a reduced, longitudinal sectional view of the bolt anchoring device of FIG. 1 in a state of the bolt being partially screwed into the anchor sleeve which is received within the bore.

Specifically, in the first place, the terminal end section 16a of the second end portion 16 is made to pass through the opening 4a to be disposed inside the anchor sleeve 2, and the externally threaded section 17 of the fastening rod portion 15 is engaged in the internally thread section 9 at the inner circumferential surface of the first end portion 5 of the anchor sleeve 2. Thereafter, the bolt 3 is turned by means of a wrench or the like tool engaging the hexagonal head 14 and is driven into the anchor sleeve 2. Thereupon, as shown in FIG. 7, the outer circumferential surface 16b of the plug portion 16 is brought into contact with the inner wall surface 6b of the second end portion 6 of the anchor sleeve 2 and pressed against the same with a gradually increasing intensity or force. When the bolt 3 is driven with a torque larger than a predetermined value so that the joint 19 is subjected to a torque larger than a predetermined value due to the frictional resistance between the outer circumferential surface 16b of the plug portion 16 of the bolt 3 and the inner circumferential surface 6b of the second end portion 6 of the anchor sleeve 2, i.e., when the difference between a tightening toque by which the bolt 3 is turned for insertion into the anchor sleeve 2 and a friction torque to which the plug portion 16 is subjected due to a friction between the plug portion 16 and the inner wall surface of the second end portion 6 when the bolt 3 is turned by the tightening torque, exceeds a predetermined value, the bolt 3 is broken at the joint 16 by the effect of the provision of the groove 20, i.e., the plug portion 6 is twisted off from the fastening rod portion 5.

Figure 8:
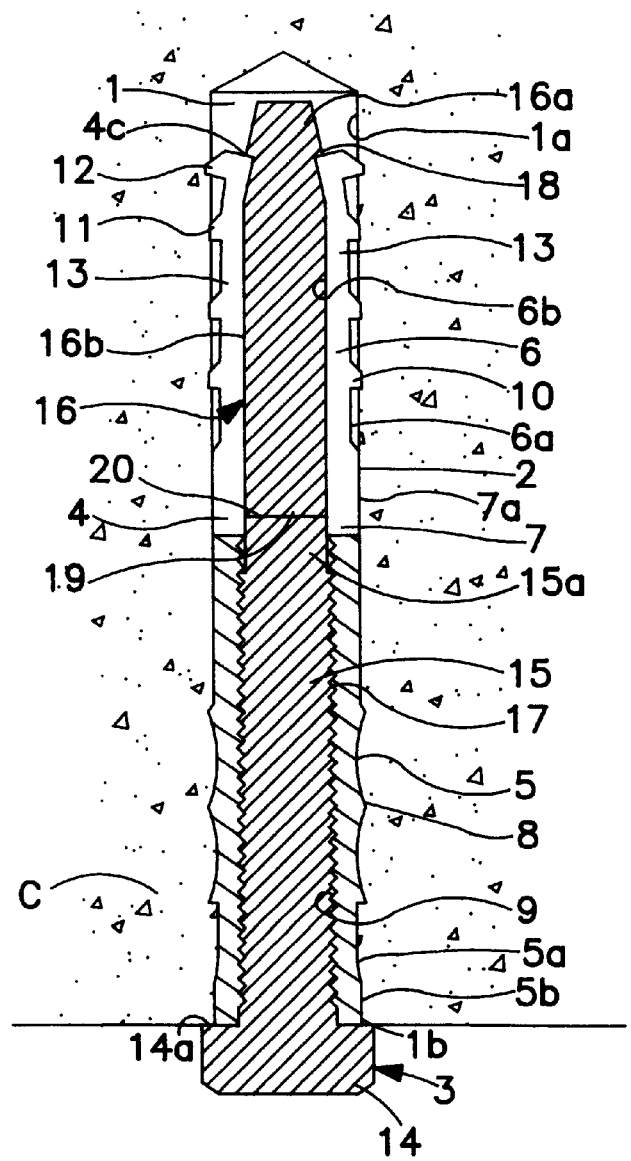
FIG. 8 a view similar to FIG. 7 but shows the bolt anchoring device in a state of the bolt being completely screwed into the anchor sleeve.

Thereafter, when the bolt 3 is further screwed into the anchor sleeve 2, the plug portion 16 is caused to move axially through the second end portion 6 of the anchor sleeve 2 while being held rotatively fixed. At the same time when the terminal end section 16a of the plug portion 16 protrudes outward through the opening 4b as shown in FIG. 8, the engagement tooth 18 is engaged with the terminal open end 4c where the opening 4b is provided, firmly by the strong radially inward reaction force acting on the larger diameter annular rib 12 having been once expanded radially outward. At this point of time, the second end portion 6 having the slits 13 is expanded radially outward by means of the plug portion 16, so the annular ribs 11 and 12 and the helical rib 10 are caused to cut more strongly into the inner wall surface 1a of the bore 1 in the concrete ceiling C, thus making it possible to secure the anchor sleeve 2 more firmly in the inner wall surface 1a of the bore 1.

Figure 9:
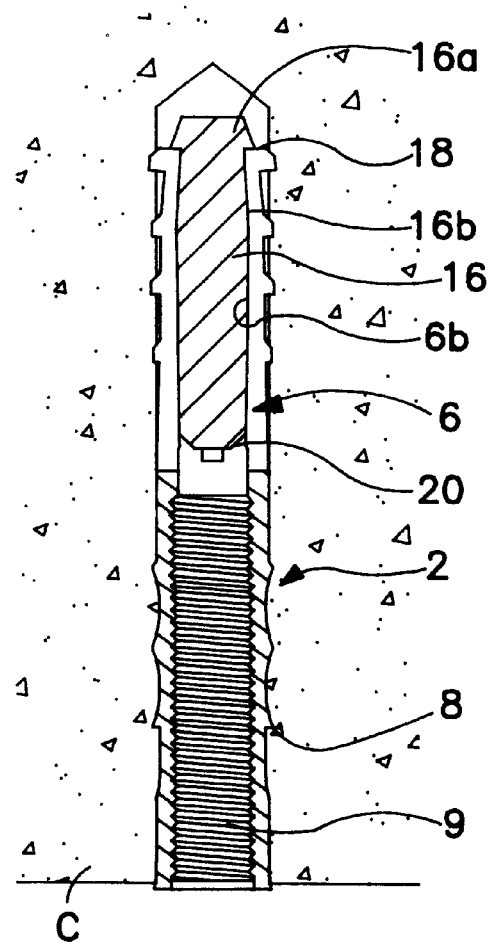
FIG. 9 is a view similar to FIG. 8 but shows the bolt anchoring device in a state of the bolt being removed from the anchor sleeve while allowing an end portion of the bolt to be left behind within bore.
Figure 9:
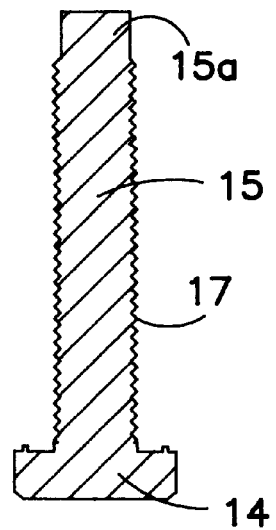

Then, as shown in FIG. 9, the bolt 3 is rotated in the reverse direction and removed from the anchor sleeve 2. In this instance, the plug portion 16 having been twisted off from the fastening rod portion 15 is left behind within the second end portion 6 of the anchor sleeve 2 due to the provision of the engagement tooth 18 engaging the terminal end 4c. Further, by the provision of the engagement tooth 18, the plug portion 16 is assuredly prevented from being removed from the anchor sleeve 2 even when subjected to a strong, radially inward reaction force applied thereto from the annular ribs 11 and 12.

Figure 10:
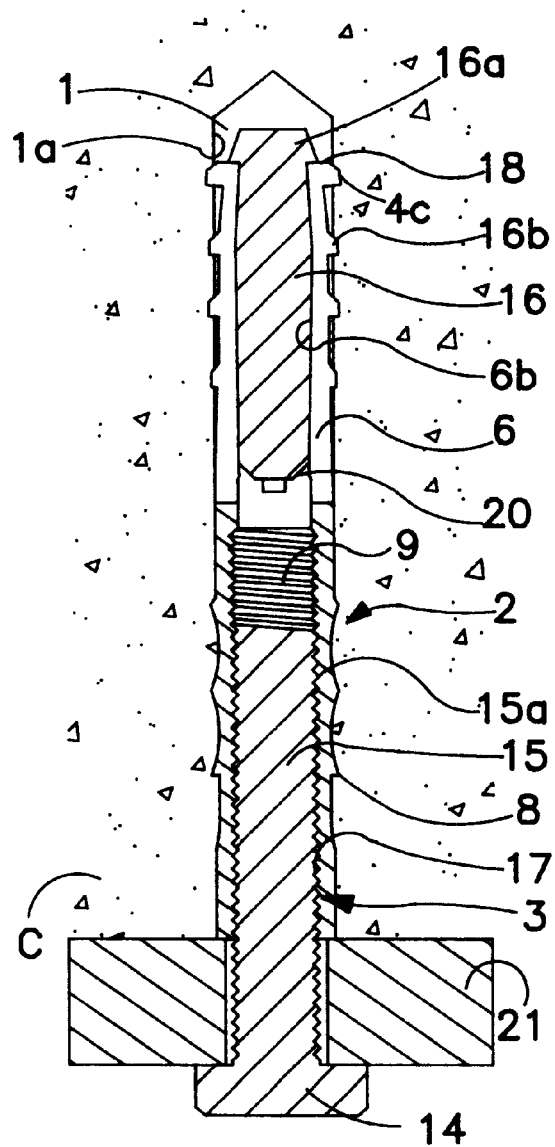
FIG. 10 is a view similar to FIG. 9 but shows the bolt anchoring device in a state of the bolt being screwed into the anchor sleeve once again to secure an angle or the like object to a ceiling.

Then, as shown in FIG. 10, the bolt 3 which passes through a predetermined angle 21 is screwed into the anchor sleeve 2 again, whereby the angle 21 can be secured to the ceiling C firmly and assuredly by way of the anchor sleeve 2.

In this manner, according to the present invention, it becomes unnecessary to beat or strike a plug or the like expansion member for expanding an anchor sleeve as in a prior art, thus making it possible to prevent the supporting wall or structure from being damaged by such beating or striking while eliminating a striking sound otherwise caused.

Further, the bolt anchoring device of this invention can be constituted by only two parts, i.e., the anchor sleeve 2 and the bolt 3, so the number of parts necessitated can be small and therefore it becomes possible to improve the manufacturing work and reduce the manufacturing cost.

Furthermore, since the fastening rod portion 15 and the plug portion 16 of the bolt 3 are separated from each other by the torque or torsional force applied to the bolt 3 when the bolt 3 is screwed halfway into the anchor sleeve 2 and thereafter the plug portion 16 can be moved axially while being held stationary in the rotational direction, i.e., without causing any substantial rotation, the frictional resistance between the outer circumferential surface 16b of the plug portion 16 and the inner circumferential surface 6b of the second end portion 6 can be smaller sufficiently. As a result, it becomes possible to operate the bolt 3 with a smaller operating force. Thus, the entire work for attachment of the bolt 3 can be easier, and the efficiency of the work for such attachment can be improved considerably.

Further, the outer diameter of the circular rib 12 of the second end portion 6 is set larger than the inner diameter of the bore 1 in the concrete ceiling C, so the radially outward reaction force acting on the second end portion 6 when the anchor sleeve 2 is received within the bore 1 can be made larger. As a result, it becomes possible to attain firm and assured provisional attachment of the anchor sleeve 2 to the inner wall surface 1a of the bore 1 in the concrete ceiling C. Thus, the screwing or driving work of the bolt 3 to be done thereafter can be easy and its safety can be improved.

Further, the inner circumferential surface 6b of the second end portion 6 is formed so as to taper, whereby such tapered surface 6b causes, in cooperation with the annular rib 12 having a larger diameter, the radially outward reaction force acting on the second end portion 6 to become more larger, thus making it possible to attain a larger retaining or securing force with which the anchor sleeve 2 is held secured relative to the inner wall surface 1a of the bore 1 in the concrete ceiling C.

Further, the slits 13 of the anchor sleeve 2 are elongated axially of the anchor sleeve 2 so as to have inner ends nearly at the axial center of the central portion 7. Thus, when the bolt 3 is screwed into the anchor sleeve 2 to cause the plug portion 16 to be pushed into the second end portion 6, the central portion 7 as well as the plug portion 6 are expanded radially outward by the provision of the slits 13 so that the anchor sleeve 2 is forced to contact or pressed against, at the outer circumferential surfaces 6a and 7a and at the lower terminal end surface 5b, the inner wall surface 1a of the bore 1 in the concrete ceiling C. Accordingly, the anchor sleeve 2 received completely within the bore 1 is forced to contact or pressed against, at the second end portion 6, the central portion 7 and the first end portion 5, the inner wall surface 1a of the bore 1, i.e., three-point forced or pressure contact of the anchor sleeve 2 with the inner wall surface 1a of the bore 1 can be attained, so the anchor sleeve 2 received within the bore 1 can have a large resistance to the external force in such a direction as to cause the anchor sleeve 2 to be pulled off from the bore 1 and in the direction crossing the axis of the anchor sleeve 2, and therefore the retaining or securing force with which the anchor sleeve 2 is retained or secured in the bore 1 can be more larger.

Accordingly, it becomes possible to prevent assuredly damage or the like of the inner wall surface 1a of the bore 1 which is otherwise caused at a portion of the inner wall surface 1a associated with the second end portion 6, due to swinging of the anchor sleeve 2 which is liable to be caused in case of two-point forced or pressure contact, thus making it possible to prevent unintended or unexpected removal of the anchor sleeve 2 that is caused due to increase in diameter of the bore 1 resulted from such damage of the bore 1.

Further, the twisted ribs 8 which cut into the inner wall surface 1a of the bore 1 in the concrete ceiling C can provide a large retaining or securing force against the rotational external force, thus making it possible to prevent assuredly the anchor sleeve 2 from rotating together with the bolt 3 when the bolt 3 is screwed into the anchor sleeve 2. By this, the work for screwing the bolt 3 into the anchor sleeve 2 can be done with ease.

Furthermore, as described above, the anchor sleeve 2 has a large resistance to the external force directed to cause the anchor sleeve 2 to be pulled off from the bore 1 and an external force crossing the axis of the anchor sleeve 2, whereby the attaching strength of each of the bolt anchoring devices which are attached to a supporting wall or structure of the same material can be constant or uniform. Accordingly, the bolt anchoring device can provide an improved reliability in attachment.

Figure 11A:
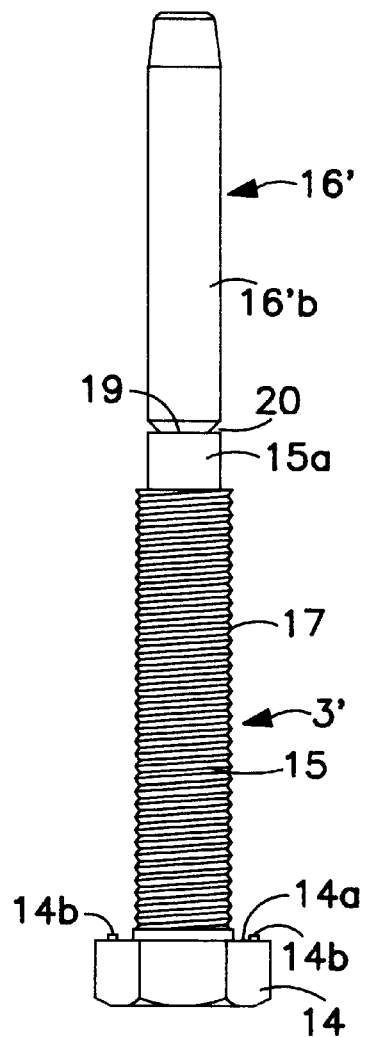
FIG. 11A is a side elevational view of a bolt according to a variant of the present invention.
Figure 11B:
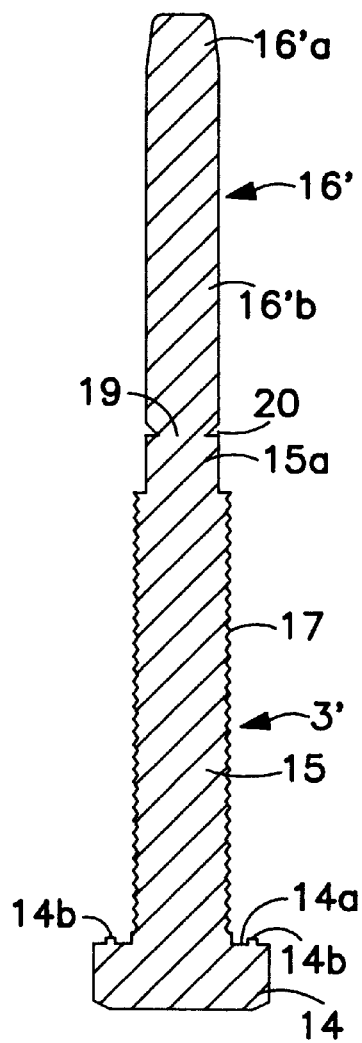
FIG. 11B is a longitudinal sectional view of the bolt of FIG. 11A.

FIGS. 11A and 11B show a variant of the above described bolt 3. In the bolt 3' of this variant, the terminal end section 16'a of the plug portion 16' is constructed to do away with an engagement tooth, i.e., the terminal end section 16'a is not provided with any engagement tooth. Except for this, the bolt 3' is substantially similar to the bolt 3 of the previous embodiment.

Accordingly, when the bolt 3 is screwed into the anchor sleeve 2, the plug portion 16' is driven axially through the second end portion 6 while being held stationary or immovable in the rotational direction after being twisted off from the fastening rod portion 15, to allow the terminal end section 16'a to protrude from the open terminal end 4c. In this instance, though the terminal end section 16'a does not engage the open terminal end 4c by means of an engagement tooth, the open terminal end 4c is made to cut into the outer circumferential surface 16'b due to a strong radially inward force acting on the large diameter annular rib 12, and furthermore the plug portion 16' has a cylindrical outer circumferential surface 16'b and is uniform in diameter, whereby a relatively large engagement force is attained between the plug portion 16' and the second end portion 6 and therefore an intended or unexpected removal of the plug portion 16' from the second end portion 6 of the anchor sleeve 2 can be prevented assuredly.

Furthermore, by dispensing with such an engagement tooth, it becomes possible to improve the manufacturing work and reduce the manufacturing cost.

Referring to FIGS. 11A–11B and 12 in which similar parts and portions to those of the first embodiment will be designated by similar reference characters, the second embodiment of the present invention will be described. This embodiment mainly differs from the first embodiment in that the anchor sleeve 102 is formed with a guide hole 122 and the bolt 103 has on the outer circumferential surface an outward flange 123.

More specifically, as shown in FIGS. 12A and 12B, the outer circumferential surface 106a of the second end portion 106 of the anchor sleeve 102 is substantially uniform in diameter, and the inner circumferential surface 106b is also substantially uniform in diameter. Further, the helical rib 110 is formed on the outer circumferential surface 106a in a way as to have such turns that are larger by two or so than those of the first embodiment, and only one rib 112 of a large diameter is provided to the terminal end of the second end portion 106.

Further, the four slits 113 provided to the second end portion 206 and the central portion 107 at equal circumferential intervals have such a tapered or varying width that is smallest at the inner ends thereof and increase gradually toward the outer ends thereof, i.e., toward the open terminal end 104c of the second end portion 106.

Further, at the inner circumferential surface of the first end portion 105, an internally threaded section 109 is provided in a way as to extend from the terminal open end having the opening 104a to the place which is distant by one third of the length of the first end portion 105 from the terminal open end having the opening 104a. The guide hole 122 is provided as to extend from the inner end of the internally threaded section 109 to nearly the axial center of the central portion 107.

The guide hole 122 has a flat inner circumferential surface 122a of a uniform diameter which is a little larger than the major diameter of the internally threaded section 109.

Further, on the second end portion 106 side of the above described guide hole 122, there is provided an annular stopper 124 in the form of an inward flange.

Figure 13:
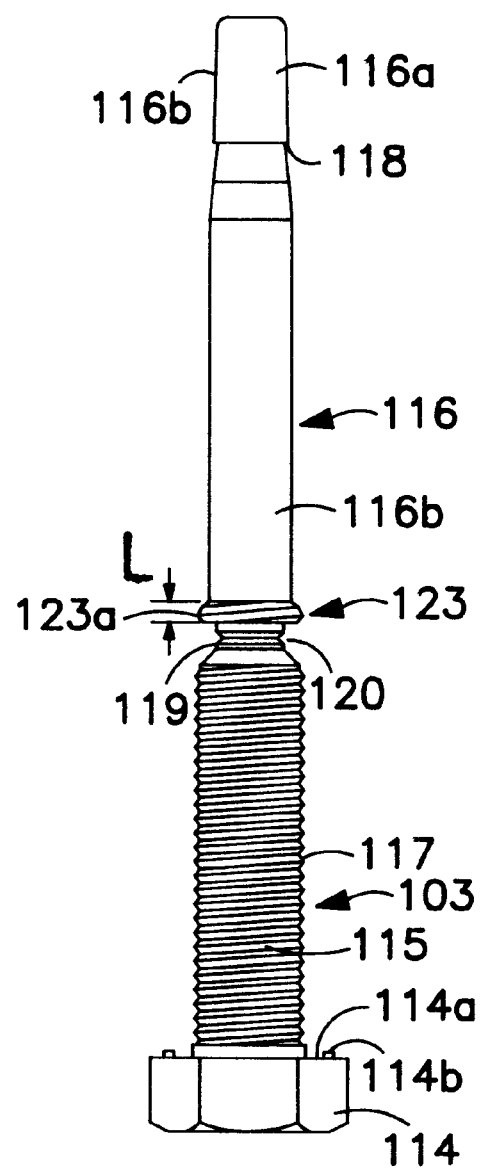
FIG. 13 is a side elevational view of a bolt for use together with the anchor sleeve of FIGS. 12A and 12B in the bolt anchoring device of the second embodiment.

On the other hand, as shown in FIG. 13, the bolt 103 is basically similar to that of the first embodiment and includes a hexagonal head 114, a fastening rod portion 115 having on an outer circumferential surface an externally threaded outer section 117 and a plug portion 116. At the joint 119 between the fastening rod portion 115 and the plug portion 116, there is provided an annular groove 120 for separation of the plug portion 116 from the fastening rod portion 115.

The plug portion 116 has on the outer circumferential surface thereof and at a location next to the groove 20 an annular or ring-shaped flange 123. The flange 123 has an externally threaded outer circumferential surface 123a which is of the same kind and size of thread as the externally threaded section 117 and is of such an axial length L as to have about two threads or ridges, i.e., about two turns of helical threads or ridges axially of the plug portion 116. Accordingly, the flange 123 is movable within the guide hole 122, and the threads or ridges of its threaded outer circumferential surface 123a is crushable or deformable by a predetermined radial compression force since the flange 23 is of such a small length L as to have only about two threads or ridges.

Figure 14:
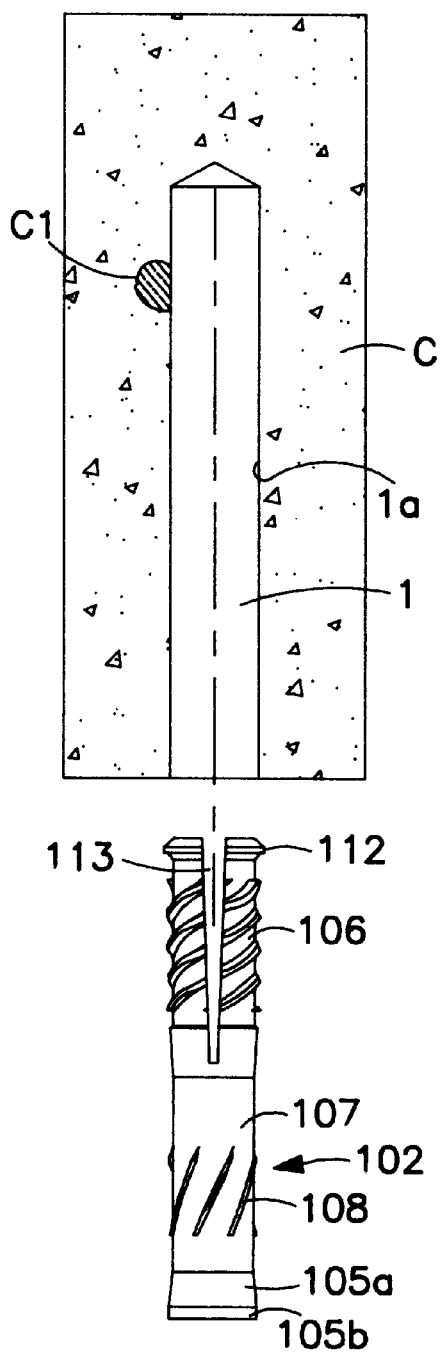
FIG. 14 shows the anchor sleeve of FIGS. 12A and 12B in side elevation and a bore in section.

Accordingly, although the operation of this embodiment is substantially similar to that of the first embodiment, its feature resides in the action of the bolt 103 which is screwed into the anchor sleeve 102 in case some of gravel mixed in the concrete composition constituting the ceiling C is exposed to the bore 1. A problem in attachment of the bolt anchoring device is caused when the bore 1 is drilled in the ceiling C to cause, as shown in FIG. 14, a relatively large pebble or stone located across the inner circumferential surface of the bore 1 to be exposed to the bore 1.

Figure 15:
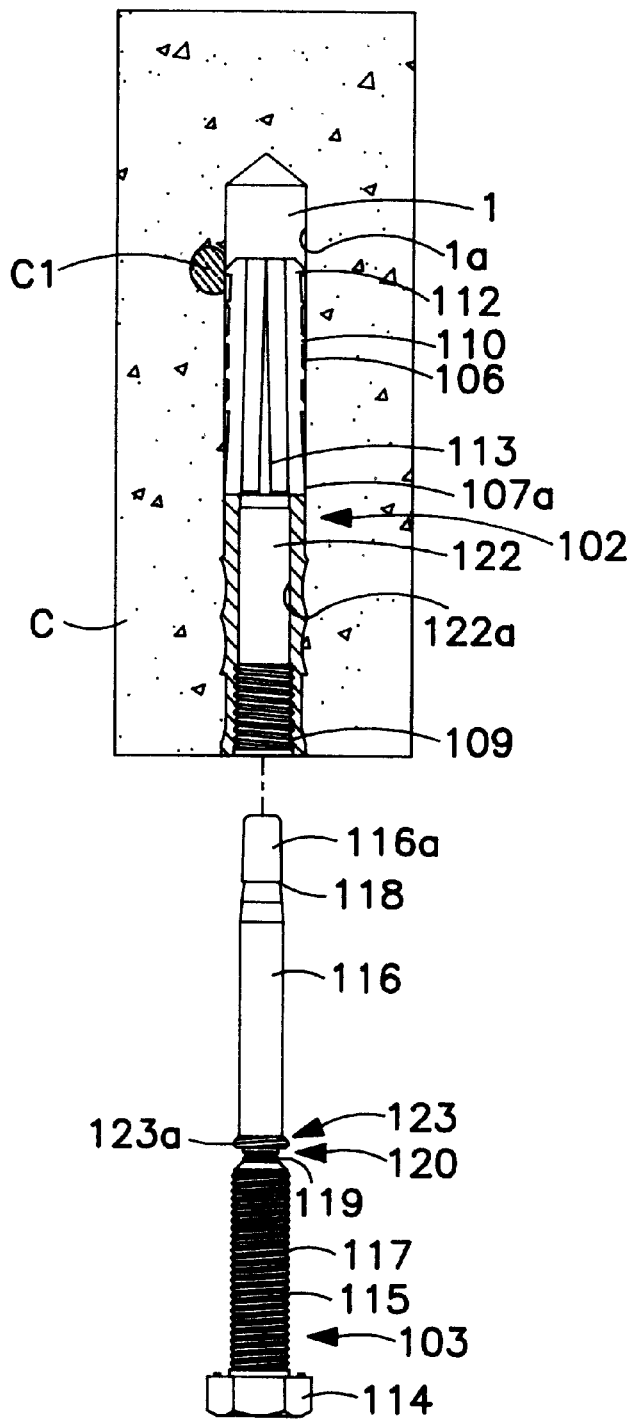
FIG. 15 shows the bolt of FIGS. 13 in side elevation and the anchor sleeve of FIGS. 12A and 12B received within the bore, in section.
Figure 16:
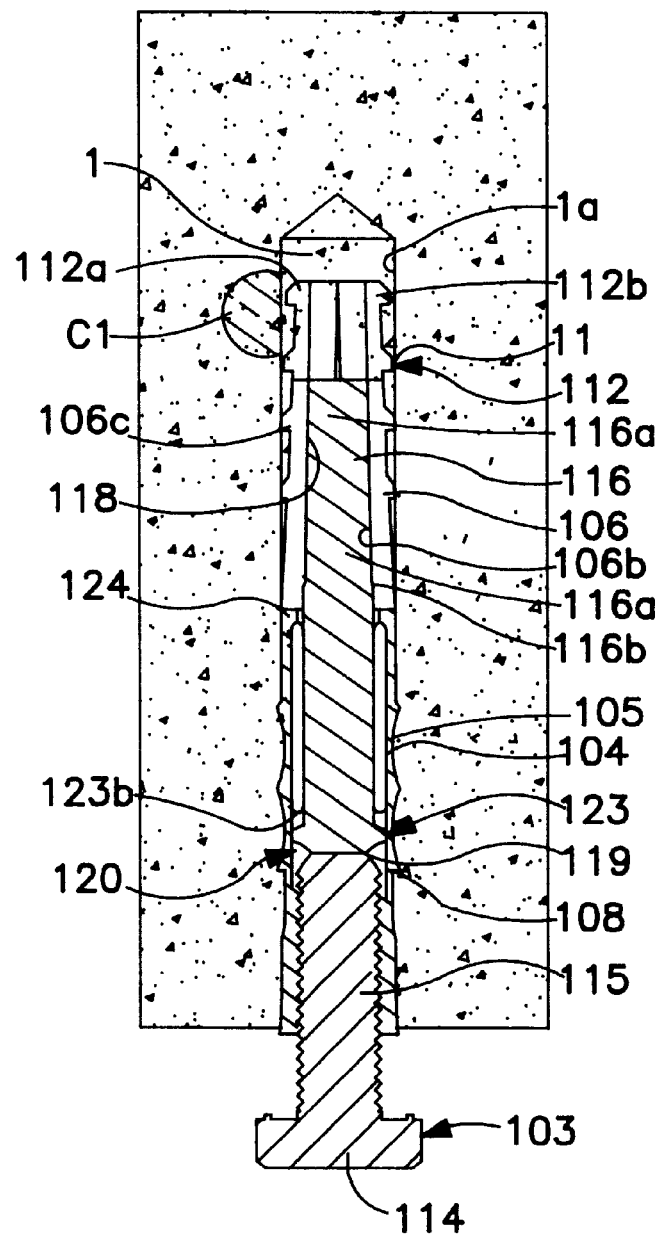
FIG. 16 is a longitudinal sectional view of the bolt of FIGS. 13 partially screwed into the anchor sleeve of FIGS. 12A and 12B received within the bore.

More specifically, when the anchor sleeve 102 is beaten by a hammer or the like to be driven into the bore 1 in the concrete ceiling C as shown in FIG. 15, the plug portion 106 of itself is pushed straightly into the bore 1 while being reduced in diameter by the effect of the slits 113. By this, the annular rib 112, the helical rib 110 and the twisted ribs 108 are caused to cut into the inner circumferential surface 1a, and the anchor sleeve 102 is secured or held firmly in the bore 1. Then, as shown in FIGS. 15 and 16, the plug portion 116 of the bolt 103 is inserted into the anchor sleeve 102 through the opening 104a to engage the externally threaded section 117 of the fastening rod portion 115 with the internally threaded section 109. Then, the hexagonal head 14 is turned by using a wrench or the like tool to drive the bolt 3 bodily into the anchor sleeve 102. When the flange 123 comes to be received within the guide hole 122, its externally threaded outer circumferential surface 123a is engaged with the inner circumferential surface 122a of the guide hole 122 to be guided thereby, whereby the plug portion 116 moves straightly through the second end portion 106 of the anchor sleeve 102.

When the bolt 103 is twisted by a torque larger than a predetermined value, i.e., the joint 119 is subjected to a torque larger than a predetermined value due to the friction torque of the plug portion 106 or due to the friction between the outer circumferential surface of the plug portion 116 and the inner circumferential surface of the second end portion 106 or when the difference between a tightening toque by which the bolt 103 is turned for insertion into the anchor sleeve 102 and a friction torque to which the plug portion 116 is subjected due to a friction between the plug portion 116 and the inner wall surface of the second end portion 106 when the bolt 103 is turned by the tightening torque, exceeds a predetermined value, the bolt 103 is broken at the joint 119 where the groove 120 for separation is provided, i.e., the plug portion 116 and the fastening rod portion 105 are separated from each other by the effect of the provision of the groove 120, similarly to the first embodiment. Thereafter, by driving the bolt 103 further into the anchor sleeve 102, the plug portion 116 moves straightly without causing any substantial rotation while being held in contact with the inner circumferential surface 106b of the second end portion 106 by being pushed by the fastening rod portion 115, with the flange 123 being guided by the inner circumferential surface 122a of the guide hole 122.

Figure 17:
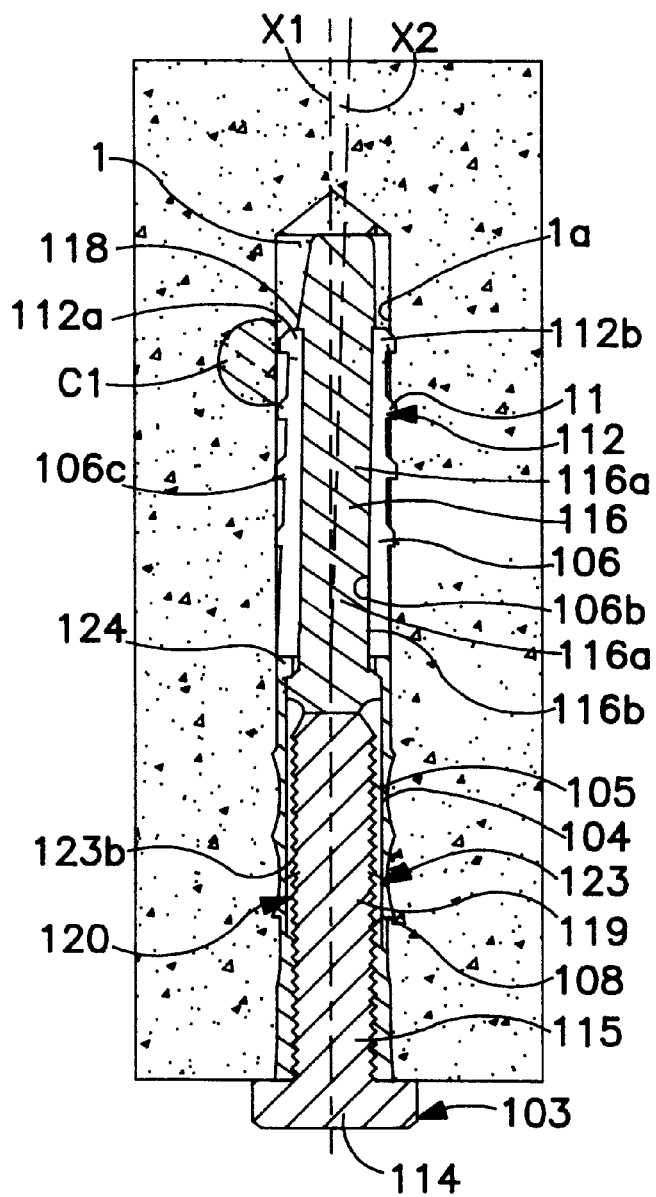
FIG. 17 is a view similar to FIG. 16 but shows the bolt in a state of being completely screwed into the anchor sleeve.

Further, the terminal end 116a of the plug portion 116 is pushed to move forward within the second end portion 106 and then applies to the second end portion 106 a force which causes the second end portion 106 to expand radially outward. In this instance, expansion of the annular rib 112 is restricted by the pebble or stone at a first portion 112a thereof in contact with the pebble or stone C1 but not at a second portion 112b thereof located diametrically opposite to the portion 112a. Due to this, the second end portion 106 is deformed or bent in a way as to cause the large diameter rib 112 to move toward the second portion 112b side, whereby the axis X2 of the anchor sleeve 102 is moved away from the axis X1 of the fastening rod portion 115 of the bolt 103. When this is the case, a large bending reaction force is applied from the inner wall surface 1a portion in contact with the first portion 112a of the annular rib 112 to the plug portion 116 through the annular rib 112. At this point of time, the central part 106c of the second end portion 106 is in pressed contact with the inner wall surface 1a of the bore 1, whereby the plug portion 116 is supported like a lever having a fulcrum adjacent the place where the central part 106c of the second end portion 106 is in pressed contact with the inner wall surface 1a of the bore 1 (i.e., adjacent the central part 106c of the second end portion 106) and subjected at the flange 123 to a bending moment that urges the flange 123 in the direction opposite to that in which the large diameter rib 112 or the terminal end 116a of the plug portion 116 is first urged when the terminal end 116a comes to expand the larger diameter rib 112, i.e., in a flange portion 123b side. The plug portion 116 is thus urged to be bent in the direction opposite to that in which it is first urged to be bent when the terminal end 116a comes to expand the larger diameter rib 112. At the same time, the portion 123b of the flange 123 is pressed against the inner circumferential surface 122a of the guide hole 122 to receive therefrom a compression force. Due to this, the external threads of the externally threaded outer circumferential surface 123a of the flange 123 is partially crushed or pressed flat at the portion 123b, thus causing the plug portion 106 to bodily incline or turn as shown in FIG. 17, i.e., in the direction in which it is urged to be bent. By this, the axis of the plug portion 116 is made to nearly coincide with the axis X2 of the bent second end portion 106b, i.e., the plug portion 116 comes to move along an axis which is nearly coincident with the axis X2 of the bent second end portion 106b, whereby it becomes possible to reduce the reaction force which is applied from the first portion 112a of the annular rib 112 to the plug portion 116. In other words, by the crushing or deformation of the of the flange 23, the plug portion 116 is inclined or turned in accordance with the bent shape of the second end portion 106 for thereby reducing the offset load which the plug portion 116 receives from the inner circumferential surface 106b of the second end portion 106.

For this reason, it becomes possible to restrict the increase in the frictional resistance between the plug portion 116 and the inner circumferential surface 106a of the second end portion 106, which results as the plug portion 116 is driven increasingly into the second end portion 106. As a result, even when the plug portion 116 is subjected to a bending force during the time when it is being driven into the second end portion 106 of the anchor sleeve 102 due to presence of a pebble or the like C1, it becomes possible to reduce the torque necessary for turning the bolt 103. Accordingly, it becomes possible to reduce the resistance of the plug portion 116 resulting when the plug portion 116 is driven to move axially without causing any substantial rotation after the plug portion 116 is separated from the fastening rod portion 115, and the operating force for tightening of the bolt 103 can be reduced.

When the bolt 103 is received in place within the anchor sleeve 102, the terminal end 116a of the plug portion 116 protrudes a predetermined length from the end of the second end portion 106 where the opening 104b is provided, as shown in FIG. 17. In this instance, the flange 123 comes to abut upon the annular stopper 124 to prevent further movement of the plug portion 116. In this instance, by the radially inward reaction force exerted by the annular rib 112 having been once expanded, the engagement tooth 118 is firmly engaged with the terminal open end 104c where the opening 104b is provided, and the annular rib 112 and so on are caused to cut further into the inner wall surface 1a of the bore 1 in the concrete ceiling C, thus securing or holding the anchor sleeve 102 firmly in the inner wall surface 1a of the bore 1.

Figure 18:
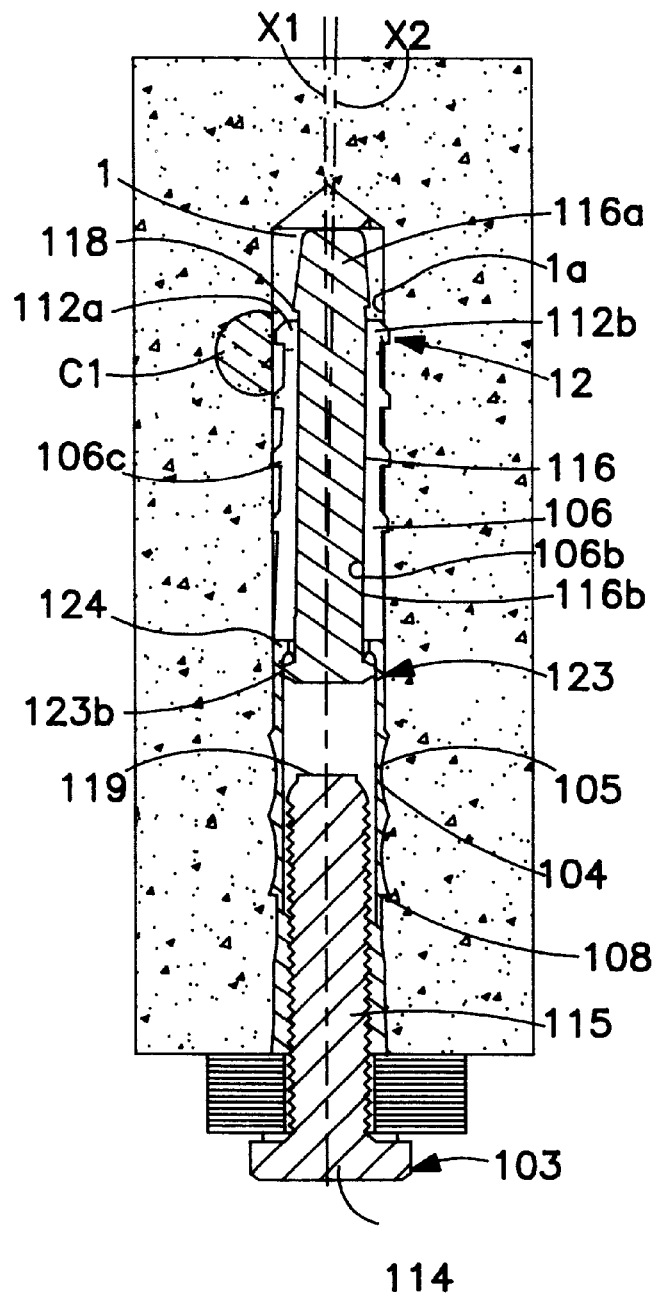
FIG. 18 is a view similar to FIG. 17 but shows the bolt in a state in which the bot having been removed from the anchor sleeve while leaving its end portion behind within the anchor sleeve, is screwed once again to support an angle or the like object.
Figure 19:
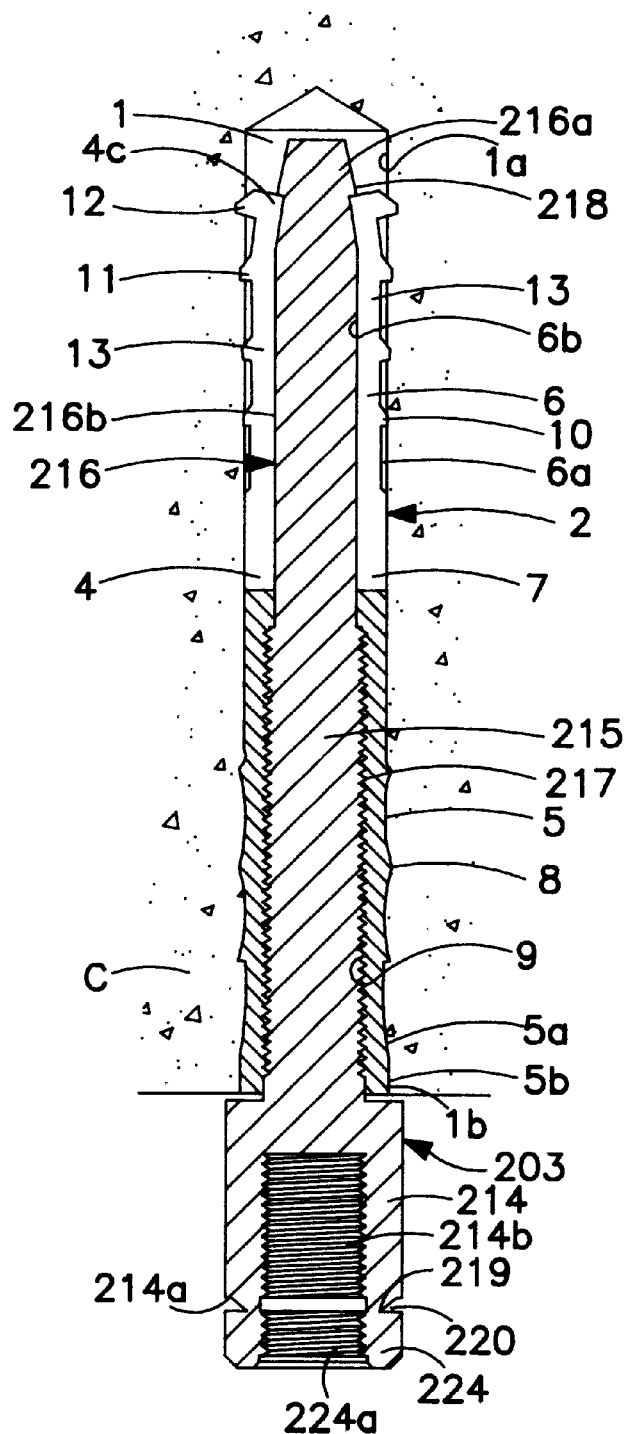
FIG. 19 is a view similar to FIG. 1 but shows a bolt anchoring device according to the third embodiment of the present invention.
Figure 20A:
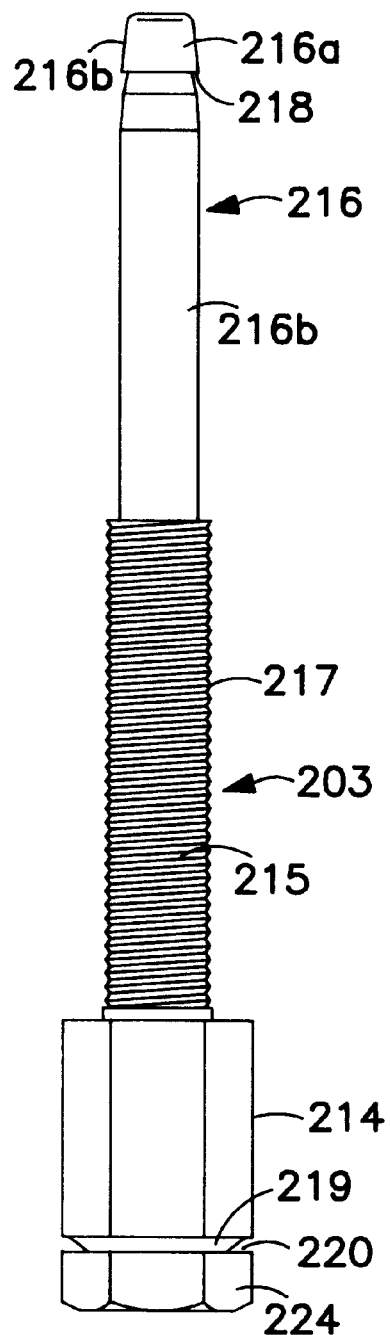
FIG. 20A is a elevational view of a bolt employed in the bolt anchors device of FIG. 19.
Figure 20B:
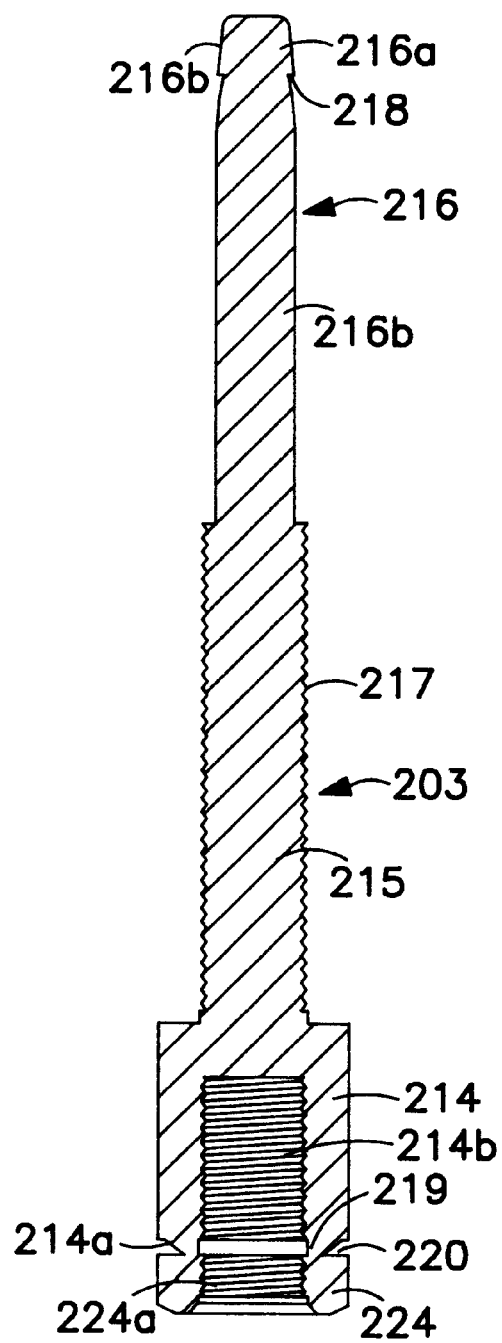
FIG. 20B is a longitudinal sectional view of the bolt of FIG. 20A.
Figure 21:
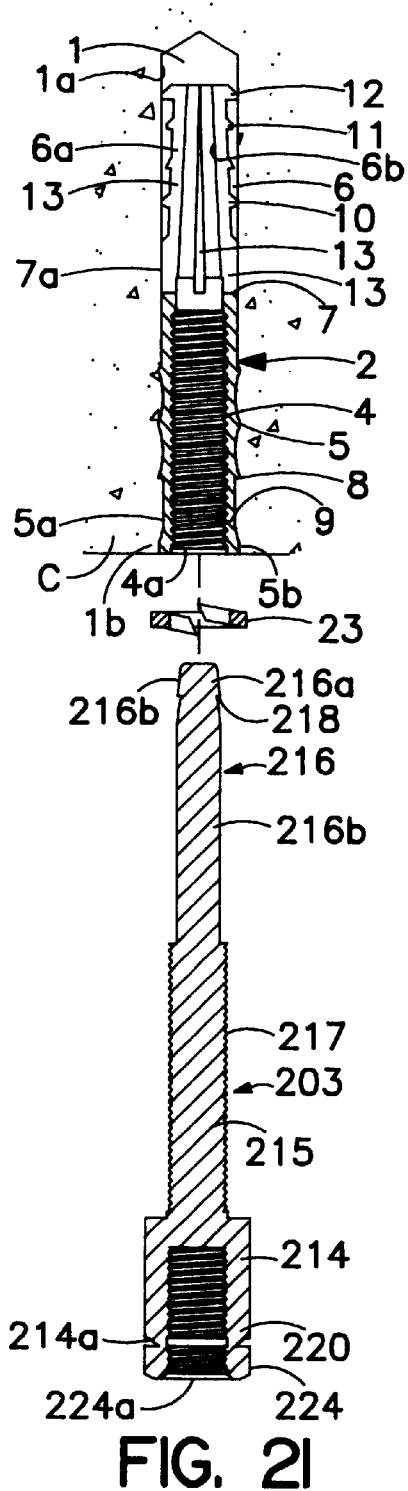
FIG. 21 is an exploded and reduced, longitudinal sectional view of the bolt anchoring device of FIG. 19 in a state of the anchor sleeve being received within the bore.
Figure 22:
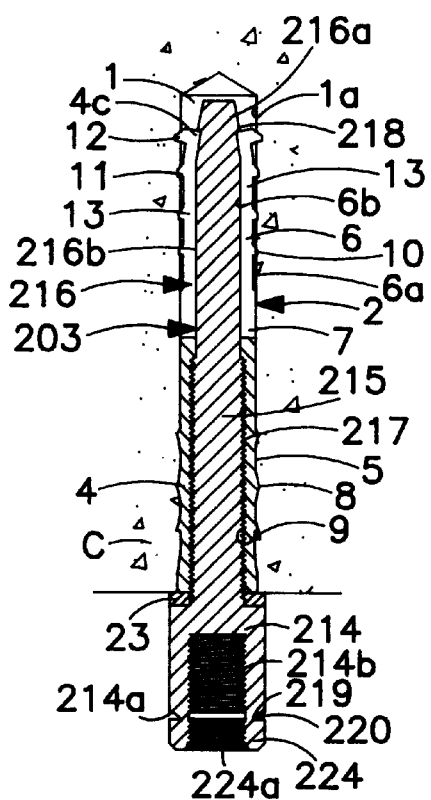
FIG. 22 is a reduced sectional view of the bolt anchoring device of FIG. 19 in a state of the bolt being completely screwed into the anchor sleeve which is received within the bore.

Then, as shown in FIG. 18, the bolt 103 is turned or rotated in the reverse direction and removed from the anchor sleeve 102. Thereafter, the bolt 103 is screwed into the anchor sleeve 102 once again after being made to pass the angle 21 similarly to the first embodiment.

This embodiment is substantially similar in operation to the above described first embodiment except for the above described operation.

Referring to FIGS. 19 to 25, a bolt anchoring device according to the third embodiment will be described. This embodiment is substantially similar to the first embodiment except for the bolt 203. The bolt 203 has a hexagonal head 214 having a relatively long axial length and an internally threaded bore 214b extending inwardly from a lower end 214a thereof and an integral nut 224 provided to the lower end 214a of the nut 214. The nut 224 has the same hexagonal outer shape as the head 214 and has an internally threaded bore 224a of the same thread as that of the internally threaded bore 214b of the head 214. An annular groove 220 is provided to the bolt 203 at the joint 219 between the head 214 and the nut 224. The groove 220 has such a depth as to enable the nut 224 to be separated from the head 214 when the nut 224 is turned in the direction reverse to that in which the bolt 203 is turned at the time of insertion into the anchor sleeve 2, to subject the joint 219 to a torque larger than a predetermined value. Such separation of the nut 224 is made in case the plug portion 216 has been driven into the anchor sleeve 2 to make the end 216a of the plug portion 216 protrude from the open end 4c while making the engagement tooth 218 engage the open end 4c of the second end portion 4 of the anchor sleeve 2, whereby to prevent the plug portion 216 from being removed from the anchor sleeve 2. The threaded bore 214b of the head 214 and the threaded bore 224a of the nut 224 are used for connecting thereto a hanging bolt 22 supporting an angle or the like as will be described more in detail. The plug portion 216 is a little smaller in diameter than the major diameter of the externally threaded section 217 of the fastening rod portion 215. Differing from the first and second embodiments, the bolt 203 is not provided with a cut or annular groove for separation of the plug portion 216 from the fastening rod portion 215. Except for the above, the bolt 203 is substantially similar to that of the first embodiment, so similar portions are designated by similar reference characters and repeated description thereto are omitted for brevity.

In operation, the anchor sleeve 2 is secured firmly in the bore 1 in the similar manner to the first embodiment. The bolt 203 having a spring washer 23 mounted thereon is screwed into the anchor sleeve 2. The plug portion 216 which rotates together with the fastening rod portion 215 is pushed with a gradually increasing force against the inner circumferential surface 6b of the second end portion 6. When the bolt 203 is screwed further into the anchor sleeve 2, the plug portion 216 moves axially while rotating through the second end portion 6 of the anchor sleeve 2 to make the terminal end 216a protrude from the open end 4c of the anchor sleeve 2 while making the engagement tooth 218 be engaged with the open end 4c firmly by a strong radially inward force exerted by the large diameter annular rib 12 having been once expanded. At this point of time, the second end portion 6 is expanded by the plug portion 216, whereby the annular ribs 11 and 12 and the helical rib 10 are caused to cut further into the inner wall surface 1a of the bore 1, thus making it possible to secure the anchor sleeve 2 firmly in the bore 1.

Figure 23:
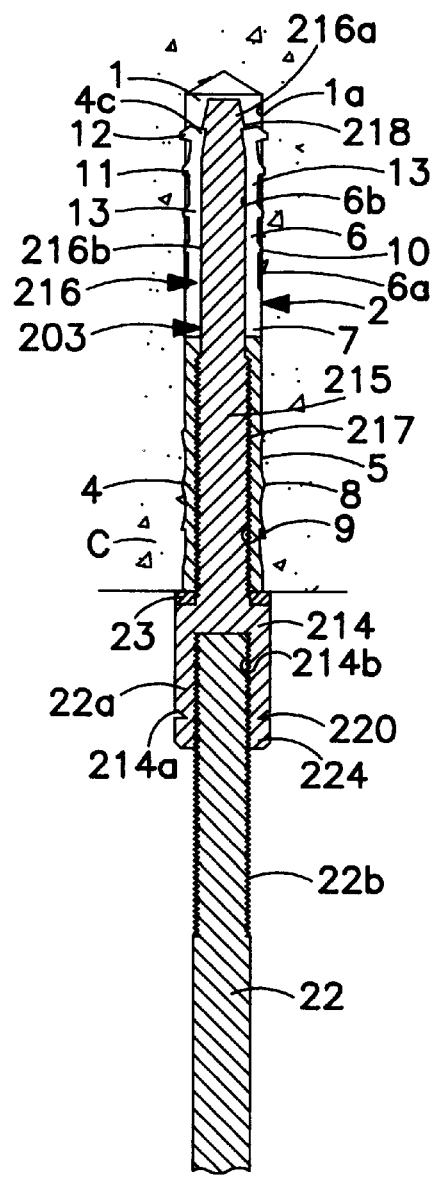
FIG. 23 is a view similar to FIG. 22 but shows a bolt anchoring device in a state of a hanging bolt being connected to the bolt.

Then, as shown in FIG. 23, an upper end 22a of a hanging bolt 22 is screwed into the threaded bore 224a of the nut 224 and the threaded bore 214b of the head 214 and tightened by means of a predetermined tool.

Figure 24:
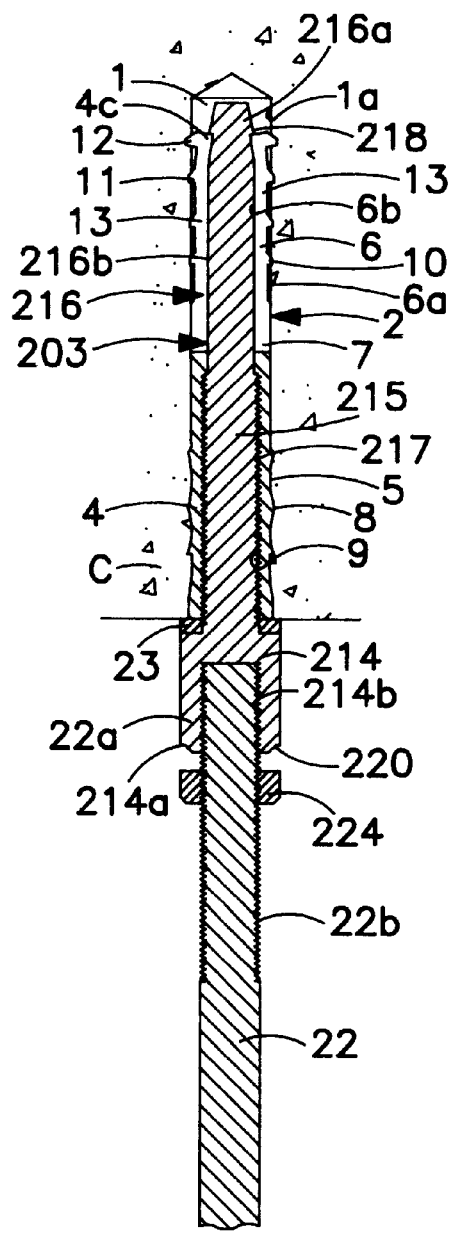
FIG. 24 is a view similar to FIG. 23 but shows the bolt anchoring device in a state of a nut being separated from a head of the bolt.

Under this condition, only the nut 224 is rotated or turned in the reverse direction, i.e., in the direction reverse to that in which the bolt 203 is rotated for screwing into the anchor sleeve 2, whereby due to the provision of the groove 220 at the joint 219 between the head 214 and the nut 224 and by means of a torque or torsional force applied to the joint 219, breakage occurs at the joint 219 to cause the nut 224 to be separated or twisted off from the head 214 as shown in FIG. 24.

Figure 25:
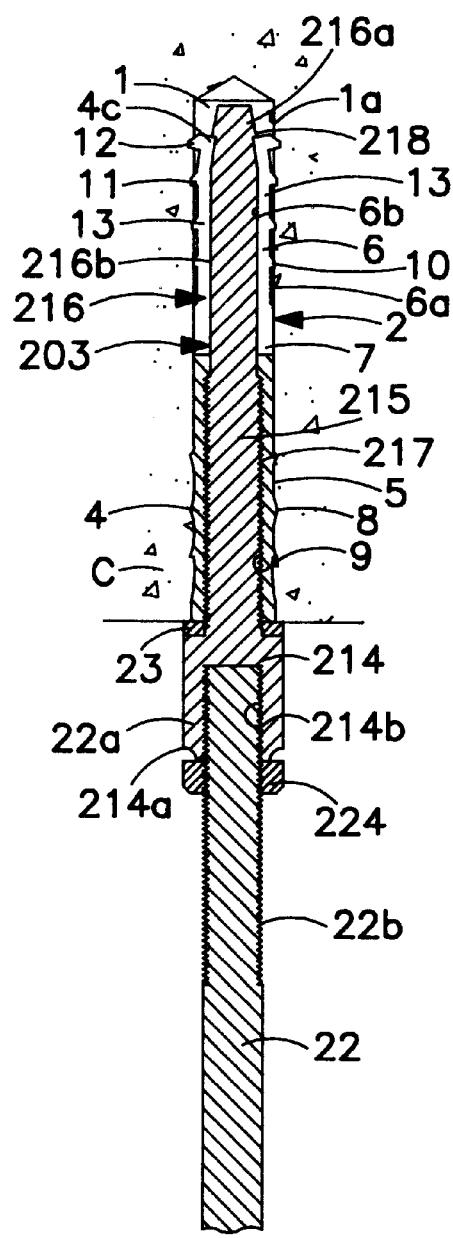
FIG. 25 is a view similar to FIG. 24 but shows the bolt anchoring device in a state of the nut being tightened to serve as a lock nut.

Thereafter, as shown in FIG. 25, the nut 224 is tightened through normal rotation, whereby the nut 224 serves as a lock nut for securing the hanging bolt 22 to the head 214 of the bolt 203 firmly and assuredly.

Accordingly, this embodiment makes it possible to secure the hanging bolt 22 firmly and stably to the anchor sleeve 2 and the bolt 203 which are in turn secured to the ceiling C firmly and assuredly.

Further, in this embodiment, the nut 224 can be separated from the head 214 with ease through breakage at the joint 219 and can be made to function as a lock nut after the bolt 203 is connected to the anchor sleeve 202, thus making it possible to carry out the attaching work of the hanging bolt 22 with a considerably improved efficiency and secure the hanging bolt 22 firmly.

Except for the above, this embodiment is substantially similar in operation and can produce substantially the same effect with the first embodiment.

Figure 26:
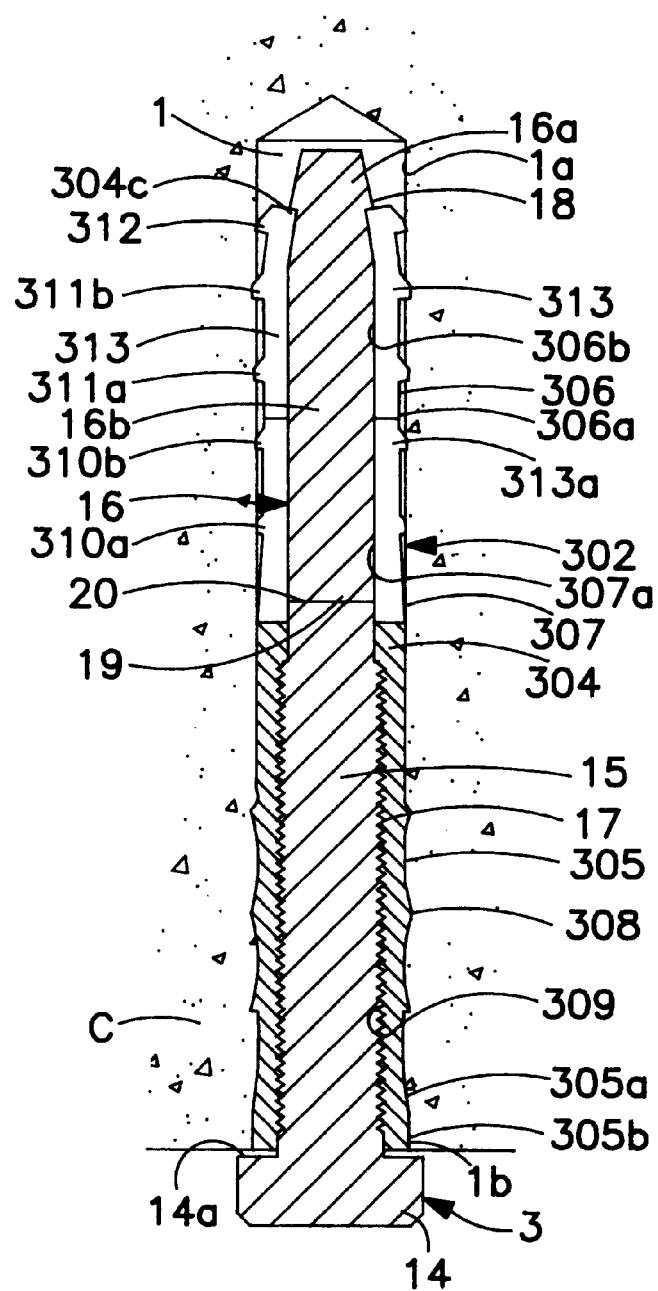
FIG. 26 is a view similar to FIG. 1 but shows a bolt anchoring device according to the fourth embodiment.
Figure 27A:
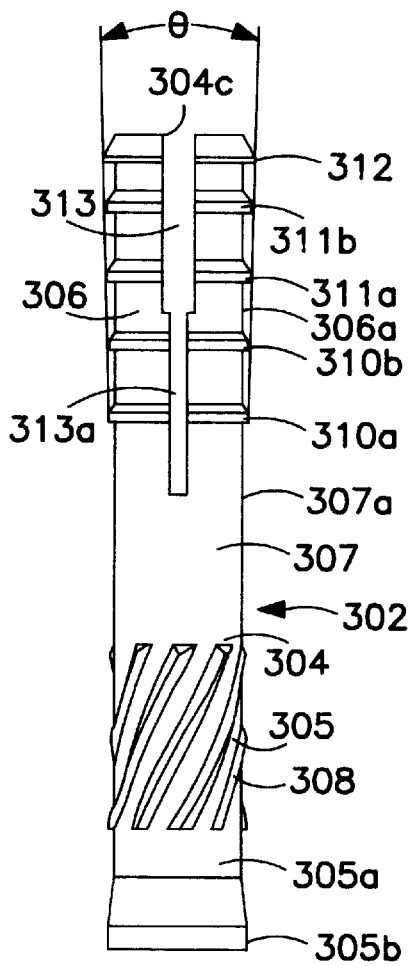
FIG. 27A is an elevational view of an anchor sleeve employed in the bolt anchoring device of FIG. 26.
Figure 27B:
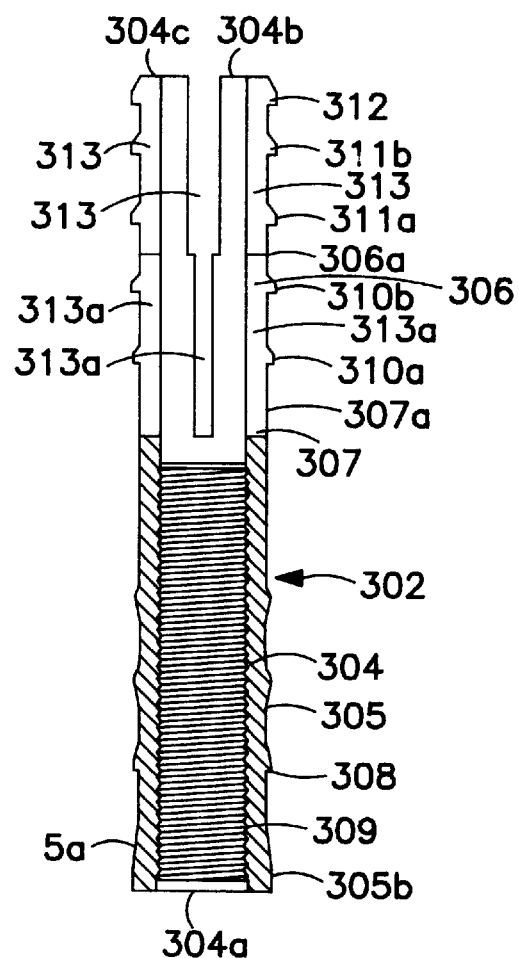
FIG. 27B is a longitudinal sectional view of the anchor sleeve of FIG. 27A.
Figure 28:
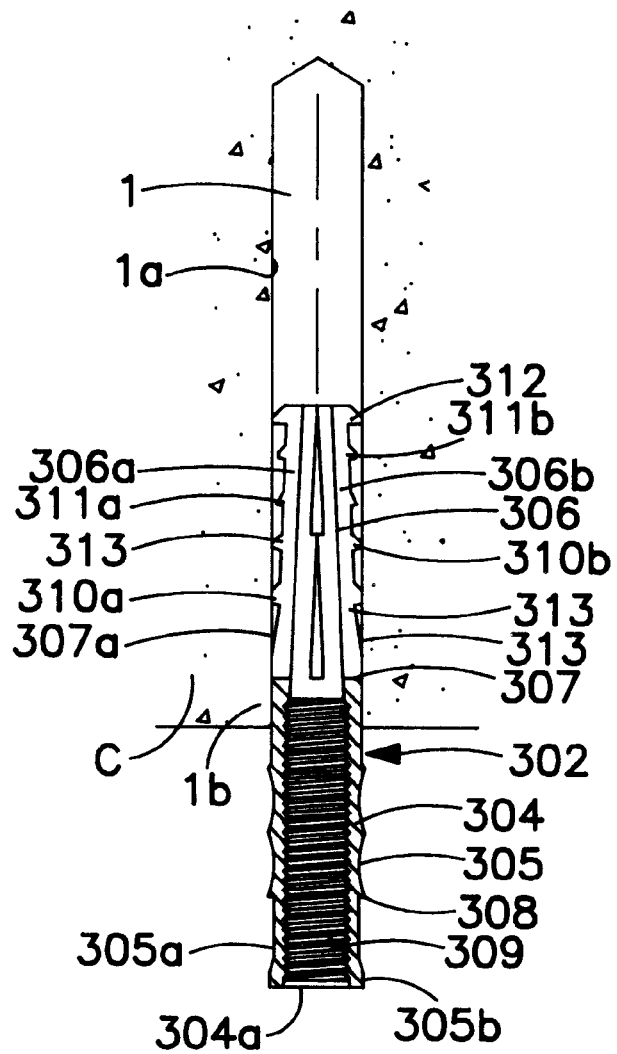
FIG. 28 is a reduced, longitudinal sectional view of the anchor sleeve of FIGS. 27A and 27B partially received within the bore.

Referring to FIGS. 26 to 28, a bolt anchoring device according to the fourth embodiment will be described. This embodiment is substantially similar to the first embodiment except for the anchor sleeve 302. In this anchor sleeve 302, the outer circumferential surface 306a of the second end portion 306 and the outer circumferential surface 307a of the central portion 307 are uniform in diameter. The inner circumferential surface 306b of the second end portion 306 is also uniform in diameter. The second end portion 306 has on the outer circumferential surface 306a four integral annular ribs 310a, 310b, 311a and 311b which are arranged with equal intervals while having at a terminal end thereof an integral annular rib 312. The ribs 310a, 310b, 311a, 311b and 312 gradually increase in diameter in a way as to have outer ends which are positioned on a conical surface having a cone angle of θ. The slits 313 provided to the second end portion 306 and the central portion 307 are substantially similar to those of the first embodiment except that each slit 313 has on the central portion 307 side thereof a smaller width section 313a. The annular ribs 310a, 310b, 311a, 311b and 312 have trapezoidal cross sections including an inclined upper side (upper in FIG. 27B) and a nearly horizontal lower side (lower in FIG. 27B), similarly to the annular rib 12 of the first embodiment. The lower rib 310a has an outer diameter which is a little larger than the inner diameter of the bore 1, and the ribs 310b, 311a, 311b and 312 become larger in diameter in this order, i.e., as they are located higher or more outward. Except for the above, the anchor sleeve 302 is substantially similar to that of the first embodiment, so similar portions are designated by similar reference characters and repeated description thereto are omitted for brevity.

In operation, such annular ribs 310a, 310b, 311a, 311b and 312 make it possible to assuredly hold the anchor sleeve 302 within the bore 1. In particular, since each slit 313 has a smaller width section 313a so as to be closed at its axially central portion when the anchor sleeve 302 is inserted into the bore 1 as shown in FIG. 28, the annular ribs 310b and 311a which are located adjacent the axially central portion of the slit 313, i.e., adjacent the axially central part of the second end portion 306 are pressed firmly or strongly against the inner wall surface 1a of the bore 1, thus making it possible to secure the anchor sleeve 302 more firmly and assuredly within the bore 1.

The present invention is not limited to the above described embodiments but various modifications and variations thereof can be made within the scope of the claims. For example, the groove for separation is not limited to be of an annular shape but can be a cut or cuts which are not provided continuously throughout the circumference but only partially. Further, the depth of the groove can be set freely depending upon the amount of insertion of the bolt into the anchor sleeve.

Further, the helical rib can be replaced by a plurality of annular ribs. Further, the cross sectional shape of the twisted ribs is not limited to a triangle but can be, for example, of other polygonal shapes. The twisted ribs can be replaced by a plurality of conical projections, i.e., the twisted ribs can be formed into various shapes so long as they do not cause any obstacle to driving or insertion of the anchor sleeve into a supporting wall or the like building material and can improve the securing of the anchor sleeve in the bore in the concrete structure.

From the foregoing, it will be understood that the anchor sleeve of the bolt anchoring device of the present invention has a self-retaining means for retaining itself in the bore prior to driving of the plug portion of the bolt into the second end portion and making the second end portion be expanded and cut into the inner wall surface of the bore, whereby the anchor sleeve can be provisionally retained in the bore firmly and assuredly and therefore the work for screwing the bolt into the anchor sleeve can be attained with ease and efficiency.

It will be further understood that the plug portion of the bolt is generally cylindrical and uniform in diameter so that it is stably pressed contact with the inner wall surface of the second end portion of the anchor sleeve and therefore is prevented from being removed from the second end portion assuredly, whereby the anchor sleeve can be secured or retained in the bore assuredly and therefore attachment and removal of the bolt to and from the anchor sleeve can be done with a high reliability.

It will be further understood that the plug portion of the anchor sleeve of the bolt anchoring device of this invention can be pushed into the second end portion of the anchor sleeve by screwing the bolt into the anchor sleeve, whereby attachment or installation of the bolt anchoring device can be attained without requiring a particular tool, without causing breakage or damage of a building material or the like, and without causing a large striking sound.

It will be further understood that the anchor sleeve of the bolt anchoring device of this invention can be secured in place within the bore irrespective of the depth of the bore, i.e., without requiring the bore to be accurate in depth, and therefore the length of the bolt protruding from the bore or the anchor sleeve can be uniform without requiring the bore to be accurate in depth.

It will be further understood that the bolt anchoring unit of this invention is made up of only two parts, i.e., an anchor sleeve and a bolt, thus making it possible to reduce the number of necessary parts and therefore the cost since the manufacturing, storage and management of the parts become easier. Particular, by screwing the bolt into the anchor sleeve to constitute an assembly, they can be transferred and handled as a single unit.

What is claimed is:

1. A bolt anchoring device for insertion into a material having a predrilled bore, the bolt anchoring device comprising:

a hollow, cylindrical anchor sleeve having a first end portion and a second end portion;

said first end portion having a threaded hole, and said second end portion having a plurality of axial slits; and a bolt extending through said anchor sleeve;

wherein said bolt has a fastening rod portion threadably engaging said threaded hole and a plug portion pushed into said second end portion to expand said second end portion;

wherein said bolt has a cut at a joint between said plug portion and said fastening rod portion so as to cause said plug portion to be separated from said fastening rod portion when the difference between a tightening torque by which said bolt is turned for insertion into said anchor sleeve and a friction torque to which said plug portion is subjected due to a friction between said plug portion and an inner wall surface of said second end portion when said bolt is turned by said tightening torque, exceeds a predetermined value; and wherein said plug portion of said bolt has an end protruding from an open end of said second end portion of said anchor sleeve when disposed in place relative to said anchor sleeve, said plug portion having at said end thereof an engagement tooth engaged with said open end of said second end portion for preventing said plug portion from being removed from said second end portion of said anchor sleeve.

2. The bolt anchoring device according to claim 1, wherein said plug portion of said bolt is adapted to be separated from said fastening rod portion when said plug portion is pushed partially into said second end portion of said anchor sleeve so that said plug portion, after separated from said fastening rod portion, moves axially without causing any substantial rotation by being pushed by said fastening rod portion.

3. The bolt anchoring device according to claim 1, wherein said second end portion of said anchor sleeve has at an axial end thereof a rib in the form of an outward flange, said rib having an outer diameter larger than a diameter of the predrilled bore when said anchor sleeve is in a condition of being disassembled from said bolt and being free from any load.

4. The bolt anchoring device according to claim 1, wherein said second end portion of said anchor sleeve has an axial end on the side opposite to said first end portion, said inner wall surface of said second end portion being tapered toward said axial end of said second end portion.

5. The bolt anchoring device according to claim 1, wherein said anchor sleeve has a central portion between said first end portion and said second end portion, said axial slits being provided so as to extend to nearly an axial center of said central portion.

6. The bolt anchoring device according to claim 1, wherein said first end portion of said anchor sleeve has said threaded hole at an end thereof and a guide hole of a diameter a little larger than a major diameter of an internal thread of said threaded hole, said plug portion of said bolt having at a location next to said joint where said cut is provided, a flange slidable in said guide hole and deformable radially when subjected to a compressive load which is directed radially thereof and larger than a predetermined value.

7. The bolt anchoring device according to claim 6, wherein said flange of said bolt has an externally threaded outer surface engageable with said threaded hole of said first end portion of said anchor sleeve, and has such an axial length that enables said flange to deform radially when subjected to said compressive load.

8. The bolt anchoring device according to claim 1, wherein said plug portion of said bolt is generally cylindrical and uniform in diameter.

* * * * *